(12) United States Patent
Tomita

(10) Patent No.: US 8,115,954 B2
(45) Date of Patent: Feb. 14, 2012

(54) PULL PRINT SUPPORTING IMAGE FORMING SYSTEM, IMAGE FORMING METHOD AND INFORMATION PROCESSING APPARATUS DIRECTED THERETO

(75) Inventor: Atsushi Tomita, Toyohashi (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 983 days.

(21) Appl. No.: 12/029,188

(22) Filed: Feb. 11, 2008

(65) Prior Publication Data
US 2009/0059274 A1 Mar. 5, 2009

(30) Foreign Application Priority Data
Aug. 28, 2007 (JP) ................. 2007-221152

(51) Int. Cl.
G06F 3/12 (2006.01)
G06K 15/00 (2006.01)

(52) U.S. Cl. ...... 358/1.15; 358/1.9; 358/1.13; 358/1.14; 358/1.18

(58) Field of Classification Search .......... 358/1.9, 358/1.13–1.18
See application file for complete search history.

(56) References Cited

U.S. PATENT DOCUMENTS

| | | | |
|---|---|---|---|
| 7,162,103 B2 * | 1/2007 | Meunier et al. | 382/305 |
| 7,321,440 B2 * | 1/2008 | Kimura | 358/1.15 |
| 7,808,672 B2 * | 10/2010 | Wu et al. | 358/1.18 |
| 7,809,807 B2 * | 10/2010 | Tominaga | 709/220 |
| 2001/0029551 A1 | 10/2001 | Higuchi | |
| 2003/0033368 A1 | 2/2003 | Tominaga | |
| 2005/0068564 A1 * | 3/2005 | Ferlitsch | 358/1.15 |
| 2006/0012835 A1 * | 1/2006 | Shimizu | 358/449 |
| 2006/0164677 A1 * | 7/2006 | Ahn | 358/1.15 |
| 2006/0224939 A1 | 10/2006 | Namikata | |
| 2008/0309961 A1 | 12/2008 | Aichi et al. | |
| 2009/0059273 A1 | 3/2009 | Tomita | |
| 2009/0059275 A1 | 3/2009 | Tomita | |

FOREIGN PATENT DOCUMENTS

| | | |
|---|---|---|
| JP | 10-124356 | 5/1998 |
| JP | 10-254662 A | 9/1998 |
| JP | 11-234436 | 8/1999 |
| JP | 2000-112687 A | 4/2000 |
| JP | 2001-216242 | 8/2001 |
| JP | 2001-249781 | 9/2001 |

(Continued)

OTHER PUBLICATIONS

Notice of Grounds of Rejection in JP 2007-221152 dated Jun. 23, 2009, and an English Translation thereof.

(Continued)

Primary Examiner — James A Thompson
Assistant Examiner — Jonathan Beckley
(74) Attorney, Agent, or Firm — Buchanan Ingersoll & Rooney PC

(57) ABSTRACT

When a specific image forming apparatus is selected as an output destination, a CPU reads a printer driver corresponding to the selected image forming apparatus from a printer driver group, and loads the driver in a memory unit or the like. On the contrary, if no specific image forming apparatus is selected as the output destination, the CPU reads a general purpose printer driver from the printer driver group, and loads the driver to the memory unit or the like. Further, the CPU displays a print setting image on a display unit 204.

16 Claims, 23 Drawing Sheets

408

| JOB ID | DOCUMENT | DESIGNATION OF OUTPUT DESTINATION |
|---|---|---|
| 132 | DOCUMENT1.doc | MFP1 |
| 133 | DOCUMENT2.doc | — |
| 134 | DOCUMENT3.doc | MFP2 |
| 135 | DOCUMENT4.doc | MFP1 |
| 136 | DOCUMENT5.doc | MFP3 |
| : | : | |
| | | |

FOREIGN PATENT DOCUMENTS

| | | |
|---|---|---|
| JP | 2002-049476 | 2/2002 |
| JP | 2002-132464 A | 5/2002 |
| JP | 2003-046761 A | 2/2003 |
| JP | 2003-050689 | 2/2003 |
| JP | 2004-072247 | 3/2004 |
| JP | 2004-074473 | 3/2004 |
| JP | 2004-193639 A | 7/2004 |
| JP | 2004-220354 | 8/2004 |
| JP | 2004-220365 A | 8/2004 |
| JP | 2004-234326 | 8/2004 |
| JP | 2004-287763 | 10/2004 |
| JP | 2005-056294 | 3/2005 |
| JP | 2005-173658 | 6/2005 |
| JP | 2006-031465 | 2/2006 |
| JP | 2006-067368 A | 3/2006 |
| JP | 2006-092373 | 4/2006 |
| JP | 2006-099714 | 4/2006 |
| JP | 2006-133877 | 5/2006 |
| JP | 2006-197158 | 7/2006 |
| JP | 2006-252300 A | 9/2006 |
| JP | 2006-287745 | 10/2006 |
| JP | 2006-350497 | 12/2006 |
| JP | 2007-030354 | 2/2007 |

OTHER PUBLICATIONS

Office Action from Japanese Patent Office issued in related Japanese Patent Application No. 2009-172022 dated Dec. 21, 2010, and an English translation thereof.

Office Action from Japanese Patent Office issued in related Japanese Patent Application No. 2007-221151 dated Jun. 23, 2009, and an English translation thereof.

Office Action from Japanese Patent Office issued in related Japanese Patent Application No. 2007-221153 dated Jun. 23, 2009, and an English translation thereof.

Decision to Grant and English Language translation, mailed Apr. 19, 2011, in JP Appln No. 2009-172022, which corresponds to related U.S. Appl. No. 12/029,237, 6 pages.

Official Action dated Apr. 20, 2011, issued by the U.S. Patent and Trademark Office in related U.S. Appl. No. 12/029,167.

Official Action dated Apr. 20, 2011, issued by the U.S. Patent and Trademark Office in related U.S. Appl. No. 12/029,237.

Decision to Grant and English-language translation, mailed Apr. 19, 2011 in Corresponding JP Appln No. 2009-172022, 6 pages.

Office Action dated Nov. 23, 2011, issued by the U.S. Patent and Trademark Office in related U.S. Appl. No. 12/029,237, 18 pages.

* cited by examiner

```
%-12345X@PJL
    @PJL SET PAPER = A4              ——— 331
    @PJL SET QTY = 2                 ——— 332
    @PJL SET DUPLEX = ON             ——— 333
330 @PJL SET BINDING = LEFT          ——— 334
    @PJL SET FINISH = SORT           ——— 335
    @PJL SET PUNCH = LEFT            ——— 336
338 —@PJL SET ENTER LANGUAGE = PCL   ——— 337
    {PDL DATA FOR DOCUMENTS}
    %-12345X
```

```
%-12345X@PJL
    @PJL SET PAPER = A4              ——— 331
330 @PJL SET QTY = 2                 ——— 332
    @PJL ENTER LANGUAGE = PCL        ——— 336
338 —{PDL DATA FOR DOCUMENTS}
    %-12345X
```

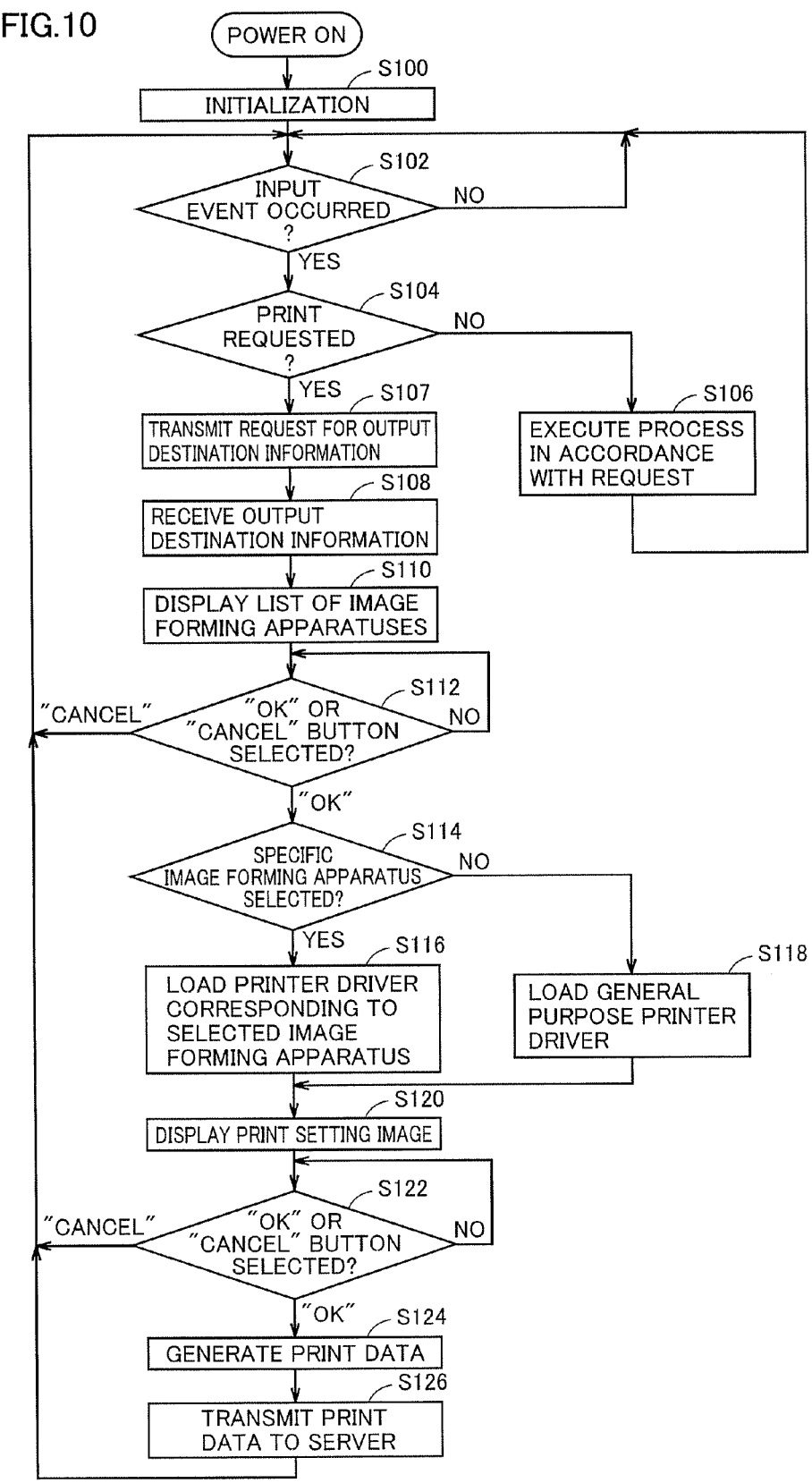

| JOB ID | DOCUMENT | DESIGNATION OF OUTPUT DESTINATION |
|---|---|---|
| 132 | DOCUMENT1.doc | MFP1 |
| 133 | DOCUMENT2.doc | — |
| 134 | DOCUMENT3.doc | MFP2 |
| 135 | DOCUMENT4.doc | MFP1 |
| 136 | DOCUMENT5.doc | MFP3 |
| : | : | |
| | | |

| IMAGE FORMING APPARATUS | IP ADDRESS | TYPE |
|---|---|---|
| MFP1 | 192.168.10.1 | TYPE a |
| MFP2 | 192.168.10.2 | TYPE b |
| MFP3 | 192.168.10.3 | TYPE b |
| MFP4 | 192.168.10.4 | TYPE a |
| MFP5 | 192.168.10.5 | TYPE c |
| : | : | : |
| | | |

| FUNCTION | MFP1 | MFP2 | MFP3 | ~ | MFPn |
|---|---|---|---|---|---|
| DOUBLE SIDED PRINT | Y | Y | N | | Y |
| Nin1 PRINT | Y | Y | N | | Y |
| SORT OUTPUT | Y | Y | N | | Y |
| GROUP OUTPUT | Y | Y | Y | | Y |
| FACE UP OUTPUT | Y | Y | N | | Y |
| STAPLE | N | Y | N | | N |
| PUNCH | N | Y | N | | N |

PULL PRINT SUPPORTING IMAGE FORMING SYSTEM, IMAGE FORMING METHOD AND INFORMATION PROCESSING APPARATUS DIRECTED THERETO

This application is based on Japanese Patent Application No. 2007-221152 filed with the Japan Patent Office on Aug. 28, 2007, the entire content of which is hereby incorporated by reference.

BACKGROUND OF THE INVENTION

1. Field of the Invention

The present invention relates to an image forming system and an image forming method that support a so-called pull print function as well as to an information processing apparatus directed thereto. More specifically, the present invention relates to a technique for lessening machine dependency of print data.

2. Description of the Related Art

Conventionally, in a configuration for forming an image (typically, printing an image on paper medium) of a document or the like, generated by an information processing apparatus such as a personal computer, by an image forming apparatus such as a printer, the information processing apparatus and the image forming apparatus are connected to each other through a network and print data is directly transmitted from the information processing apparatus to the image forming apparatus. In such a configuration, the information processing apparatus and the image forming apparatus are connected in one-to-one correspondence.

As another approach, a so-called client-server type configuration is also available. In the client-server configuration, print data transmitted from a plurality of information processing apparatuses are once collected to a server, generally referred to as a print server. The print data (or print jobs) collected by the print server are transmitted to the image forming apparatus in a prescribed order. In this configuration, a plurality of information processing apparatuses share one image forming apparatus, by the server.

Recently, a scheme referred to as "pull print" or "ubiquitous print" has been proposed, which is an improvement over the client-server configuration. In the pull print supporting configuration, a server collects print data generated by any of the information processing apparatuses, and any of the image forming apparatuses selectively obtains print data collected in the server and forms an image of obtained print data. As an example of such pull print supporting configuration, Japanese Laid-Open Patent Publication No. 2004-220354 discloses a network printing system that allows a user to directly and plainly specify an output destination printer. The network printing system includes one or a plurality of client terminals, a print server and one or a plurality of printers, connected by a network.

In such a pull print supporting configuration, it is possible to form an image of an arbitrary print data by an arbitrary image forming apparatus. Therefore, when an image forming apparatus is busy with processing, destination can easily be changed to another image processing apparatus to finish the process.

Image forming apparatuses of late allow installation of various and many functions, and by such functions, various print settings may be made when the print data is generated by the information processing apparatus. The print setting designated on the side of information processing apparatus is added as setting information to the print data and transmitted to the server.

On the other hand, among the plurality of image forming apparatuses, there may be one not supporting most of the above-described functions. Therefore, when print data, prepared on the assumption that various and many functions are available, were processed by an image forming apparatus having limited functions only, the resulting output would be unsatisfactory.

Among the users, there may be one who determines print settings assuming output from a specific image forming apparatus considering the intended use before generating the print data, or one who generates print data without specifying any image forming apparatus as the output destination.

If an image forming apparatus is specified as the output destination, it is preferred to generate the print data to fully make use of the functions supported by the image forming apparatus. On the contrary, if the image forming apparatus as the output destination is not specified, it is preferred to prepare the print data such that similar output result can be attained by any of the image forming apparatuses, regardless of the difference of functions supported by each of the image forming apparatuses.

SUMMARY OF THE INVENTION

The present invention was made to solve the above-described problem, and its object is to provide pull print supporting image forming system and image forming method as well as an information processing apparatus directed thereto, that can generate print data appropriate for the image forming apparatus as the output destination.

According to an aspect, the present invention provides an image forming system, including at least one information processing apparatus capable of transmitting print data; a server receiving the print data from the information processing apparatus; and at least one image forming apparatus capable of data communication with the server. The information processing apparatus includes an output destination information requesting unit transmitting a request for output destination information of the print data to the server, in accordance with a user operation, an output destination display unit displaying a list of output destinations based on the output destination information from the server, a setting image display unit displaying a setting image for receiving setting related to image formation, in accordance with a user operation input to the list of the output destinations, a print data generating unit generating print data in accordance with a user operation input to the setting image, and a print data transmitting unit transmitting the generated print data to the server. The setting image display unit changes manner of display of the setting image dependent on selection/non-selection of a specific output destination. The server includes an output destination information transmitting unit responsive to the output destination information request from the information processing apparatus, for transmitting device information obtained in advance for each image forming apparatus as the output destination information, to the information processing apparatus, a print data storage unit storing the print data from the information processing device, a list transmitting unit responsive to a list request from the image forming apparatus, for transmitting the list of the print data stored in the print data storage unit to the image forming apparatus as a transmission source of the list request, and a print data transmitting unit responsive to the print data request from the image forming apparatus, for transmitting a specific print data stored in the print data storage unit to the image forming apparatus. The image forming apparatus includes a list requesting unit transmitting the list request to the server, in accordance with a user operation, a list display unit displaying the list of the print data from the server, a print data requesting unit transmitting the data request for specifying the selected print data to the server in accordance with a user operation, and a processing unit for performing an image forming process based on the print data from the server Preferably, the print data generating unit adds information indicating selection and non-selection of the specific output destination to the print data; the list transmitting unit transmits the list including the information indicating selection and non-selection of the specific output destination added to the print data; and the list display unit displays the list of print data together with the information indicating selection and non-selection of the specific output destination.

Preferably, the image forming apparatus is capable of selectively supporting a plurality of functions; the setting related to image formation includes an item that depends on any of the plurality of functions; the output destination information includes a state of supporting the plurality of functions in the image forming apparatus, and the setting image display unit displays, when a specific output destination is selected, a specific setting image based on the state of supporting in the image forming apparatus as the selected output destination.

More preferably, the setting image display unit displays the setting image, using an instruction code corresponding to the state of supporting in the image forming apparatus as the selected output destination, among a plurality of instruction codes stored in advance.

Further preferably, the information processing apparatus further includes a selection information transmitting unit transmitting selection information specifying the selected output destination to the server; the server further includes an instruction code transmitting unit responsive to the selection information from the information processing apparatus for transmitting, among a plurality of instruction codes stored in advance, an instruction code corresponding to the state of supporting in the image forming apparatus as the selected output destination, to the information processing apparatus; and the setting image display unit displays the setting image, using the instruction code from the server.

Preferably, the setting image display unit displays a setting image consisting of items commonly executable by the image forming apparatuses, when a specific output destination is not selected.

Preferably, the information processing apparatus further includes a calculating unit calculating ratio of supporting each of the plurality of functions, based on the output destination information from the server; and when a specific output destination is not selected, the setting image display unit changes, together with items included in the setting related to image formation, the manner of display of each item, in accordance with the ratio of supporting the function necessary to execute the corresponding item.

According to another aspect, the present invention provides an image forming method using an image forming system, wherein the image forming system includes at least one information processing apparatus capable of transmitting print data; a server receiving the print data from the information processing apparatus, and at least one image forming apparatus capable of data communication with the server. The image forming method includes the steps of: the information processing apparatus transmitting a request for output destination information of the print data to the sever, in accordance with a user operation, the server transmitting device information obtained in advance for each image forming apparatus as the output destination information to the information processing apparatus, in response to the request for output destination information from the information processing apparatus, the information processing apparatus displaying a list of output destinations based on the output destination information from the server; the information processing apparatus displaying a setting image allowing setting related to image formation, in accordance with a user operation input to the list of output destinations; the information processing apparatus generating print data in accordance with a user operation input to the setting image; the information processing apparatus transmitting the generated print data to the server; the server storing the print data from the information processing apparatus, the image forming apparatus transmitting a list request to the server in accordance with a user operation; the server transmitting, in response to the list request from the image forming apparatus, the list of stored print data to the image forming apparatus as a source of transmission of the list request; the image forming apparatus displaying the list of print data from the server; the image forming apparatus transmitting the data request for specifying selected print data to the server in accordance with a user operation; the server transmitting, in response to the print data request from the image forming apparatus, stored specific print data to the image forming apparatus; and the image forming apparatus performing an image forming process based on the print data from the server. The step of displaying the setting image includes the step of changing the manner of display of the setting image dependent on selection of a specific output destination or non-selection of an output destination.

Preferably, the step of generating print data includes the step of adding information indicating selection and non-selection of the specific output destination to the print data; the step of transmitting the list of print data includes the step of transmitting the list including the information indicating selection and non-selection of the specific output destination added to the print data; and the step of displaying the list includes the step of displaying the list of print data together with the information indicating selection and non-selection of the specific output destination.

Preferably, the image forming apparatus is capable of selectively supporting a plurality of functions; the setting related to image formation includes an item that depends on any of the plurality of functions; the output destination information includes a state of supporting the plurality of functions in the image forming apparatus; and the step of displaying the setting image further includes the step of displaying, when a specific output destination is selected, a specific setting image, based on the state of supporting in the image forming apparatus as the selected output destination.

More preferably, the step of displaying the setting image further includes the step of displaying the setting image, using an instruction code corresponding to the state of supporting in the image forming apparatus as the selected output destination, among a plurality of instruction codes stored in advance.

More preferably, the image forming method further includes the steps of: the information processing apparatus transmitting selection information specifying the selected output destination to the server; and the server transmitting, to the information processing apparatus, an instruction code corresponding to the state of supporting in the image forming apparatus as the selected output destination, among a plurality of instruction codes stored in advance, in response to the selection information from the information processing apparatus, wherein the step of displaying the setting image further includes the step of displaying the setting image using the instruction code from the server.

Preferably, the step of displaying the setting image further includes the step of displaying a setting image consisting of items commonly executable by the image forming apparatuses, when a specific output destination is not selected.

Preferably, the image forming method further includes the steps of the information processing apparatus calculating ratio of supporting each of the plurality of functions, based on the output destination information from the server, and the step of displaying the setting image further includes the step of changing, when a specific output destination is not selected, together with the items included in the setting related to image formation, the manner of display of each item, in accordance with the ratio of supporting the function necessary to execute the corresponding item.

According to a still further aspect, the present invention provides an information processing apparatus capable of transmitting print data to a server, wherein the server is configured to be capable of data communication with at least one image forming apparatus, and transmits the print data stored in advance to the image forming apparatus in response to a request from the image forming apparatus. The information processing apparatus includes an output destination information requesting unit for transmitting a request for output destination information of the print data to the server, in accordance with a user operation; and the server transmits, in response to the request for output destination information, device information obtained in advance for each the image forming apparatus as the output destination information to the information processing apparatus. The information processing apparatus includes: an output destination display unit displaying a list of output destinations based on the output destination information from the server; a setting image display unit displaying a setting image for receiving setting related to image formation, in accordance with a user operation input to the list of the output destinations; a print data generating unit generating print data in accordance with a user operation input to the setting image; and a print data transmitting unit transmitting generated print data to the server; wherein the setting image display unit changes the manner of displaying the setting image, dependent on selection of a specific output destination or non-selection of an output destination.

By the present invention, it is possible to generate appropriate print data dependent on the image forming apparatus as the output destination, in a pull print supporting configuration.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 10 is a flowchart representing process procedure related to print data generation in the personal computer in accordance with Embodiment 1 of the present invention.

FIG. 12 shows an example of data structure stored in a print list storage unit of the server in accordance with Embodiment 1 of the present invention.

FIG. 13 shows an example of data structure stored in a network setting data storage unit of the server in accordance with Embodiment 1 of the present invention.

FIG. 14 shows an example of data structure stored in a device information storage unit of the server in accordance with Embodiment 1 of the present invention.

DESCRIPTION OF THE PREFERRED EMBODIMENTS

Figure 1:
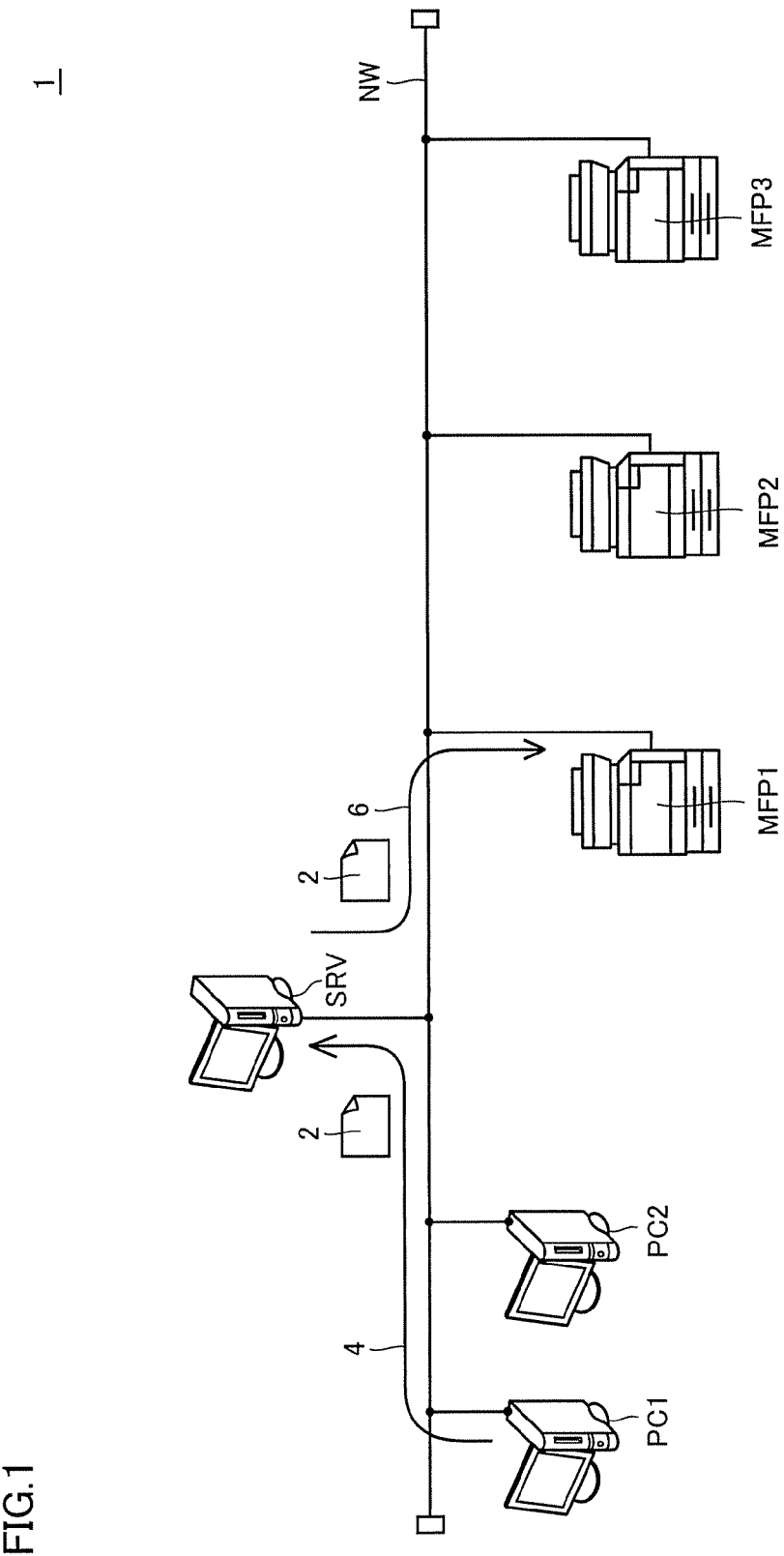
FIG. 1 schematically shows a configuration of the image forming system in accordance with Embodiment 1 of the present invention.

Embodiments of the present invention will be described in detail with reference to the figures. In the figures, the same or corresponding portions are denoted by the same reference characters and description thereof will not be repeated.

Embodiment 1

(Overall Configuration of Image Forming System)

Referring to FIG. 1, an image forming system 1 in accordance with Embodiment 1 of the present invention includes personal computers PC1 and PC2 as representative examples of image processing apparatus, a server SRV, and image forming apparatuses MFP1, MFP2 and MFP3, all connected to one same network NW.

Personal computers PC1 and PC2, server SRV, and image forming apparatuses MFP1, MFP2 and MFP3 are configured to allow data communication with each other. The network NW may be a private line such as LAN (Local Area Network) or WAN (Wide Area Network), or a public line such as virtual private network, which may be partially or fully implemented to realize wireless communication such as wireless LAN. The present invention is applicable to a configuration that allows data communication between personal computer PC1 or PC2 and server SRV and between the server SRV and image forming apparatus MFP1, MFP2 or MFP3, and therefore, independent networks may be formed to connect these components to each other.

In personal computers PC1 and PC2, application programs including document creation and spread sheet are installed, and print data 2 is generated from a document or the like formed by the user using such an application program. More specifically, a printer driver installed beforehand in personal computer PC1 or PC2 generates control codes (typically, a page description language) that can be interpreted by image forming apparatuses MFP1 to MFP3, in accordance with a drawing instruction output from the application program or the operating system (OS). The print data 2 includes setting information related to printing, set by the user at the time of generation.

Personal computer PC1, PC2 transmits print data 2 generated in this manner to server SRV (transmission path 4). When pull print is not performed, the print data 2 may directly be transmitted to any of image forming apparatuses MFP1 to MFP3

Server SRV receives and stores the print data 2 transmitted from personal computer PC1, PC2, and when it receives a pull print request from any of image forming apparatuses MFP1 to MFP3, transmits the stored print data 2 to the image forming apparatus that issued the request (transmission path 6).

Image forming apparatuses MFP1 to MFP3 are typically a Multi Function Peripheral (MFP) having a plurality of functions including copying function, facsimile function and scanner function. In accordance with a user operation, image forming apparatuses MFP1 to MFP3 transmit, to the server SRV, a pull print request for pulling selected print data, that is, for obtaining the print data, from among the print data stored in the server SRV. Receiving the print data 2 from server SRV, image forming apparatuses MFP1 to MFP3 perform image forming process. The image forming process includes printing on paper medium and facsimile transmission.

Particularly, personal computers PC1 and PC2 display a list of output destination (list of image forming apparatuses MFP1 to MFP3) based on the output destination information from server SRV, in response to a print request from the user. When a specific image forming apparatus is selected as the output destination by the user, or when no specific image forming apparatus is selected as the output destination, personal computers PC1 and PC2 display a setting image reflecting the selection or non-selection. At this time, the manner of display of the setting image on personal computers PC1 and PC2 is changed dependent on whether the user has selected the output destination or not. By changing the manner of display of the setting image, it becomes possible for the user to easily determine print setting appropriate for the image forming apparatus as the output destination.

The print data generated in accordance with the print setting is transmitted from the server SRV to the corresponding image forming apparatus as the user operates the image forming apparatus MFP1 to MFP3, and the image forming process (typically, printing process) is executed.

In the following, a configuration that realizes such a function will be described. In the following, personal computers PC1 and PC2 will be generally represented as "personal computer PC" and image forming apparatuses MFP1 to MFP3 will be generally represented as "image forming apparatus MFP."

(Hardware Configuration of Image Forming Apparatus)

Figure 2:
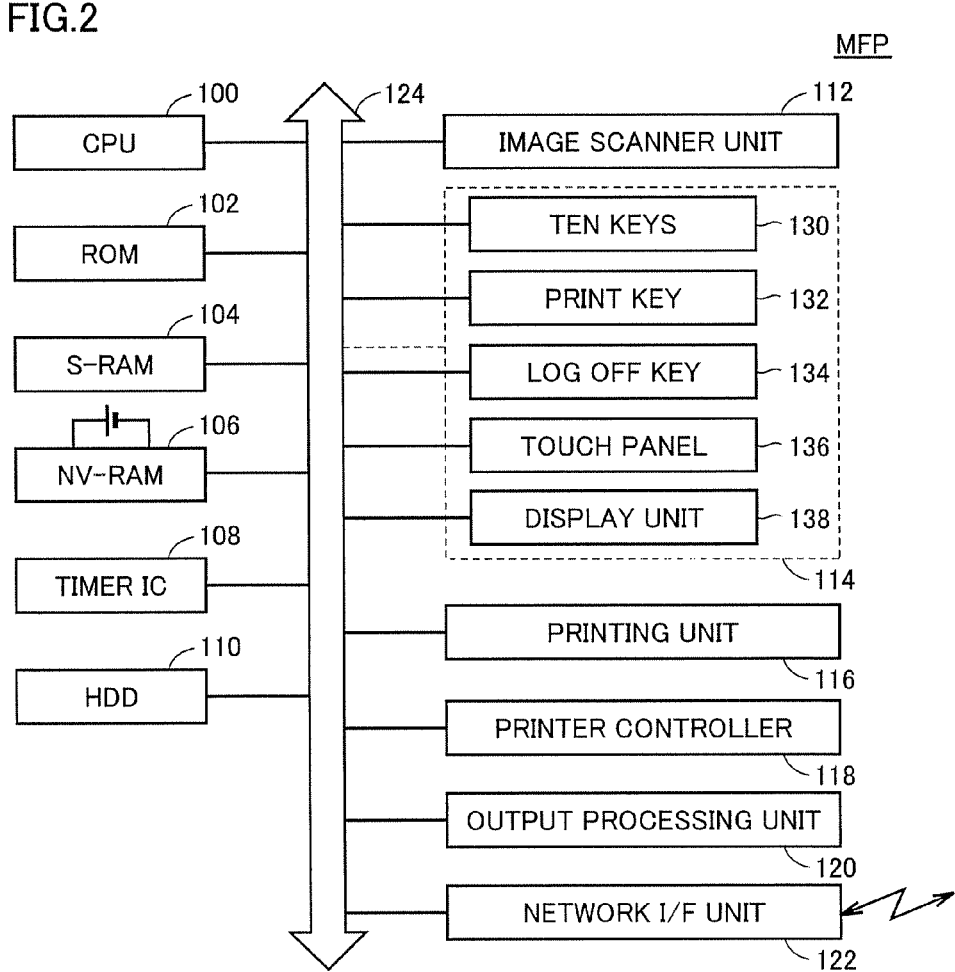
FIG. 2 schematically shows plain hardware configuration of the image forming apparatus in accordance with Embodiment 1 of the present invention.

Referring to FIG. 2, image forming apparatus MFP in accordance with Embodiment 1 of the present invention includes a CPU (Central Processing Unit) 100, an ROM (Read Only Memory) 102, an S-RAM (Static-Random Access Memory) 104, an NV-RAM (Non-Volatile Random Access Memory) 106, and a timer IC (Integrated Circuit) 108. These parts are connected to each other through a bus 124.

CPU 100 reads a program stored in advance in ROM 102 or the like to S-RAM 104 as a work memory and executes the program, whereby the process in accordance with the present embodiment is realized. Further, NV-RAM 106 stores various settings related to image formation of the MFP in a non-volatile manner. Particularly, NV-RAM 106 stores device information including the state of functions supported in the image forming apparatus MFP. Such device information is set before shipment, or by a maintenance person when a new function is added. Alternatively, CPU 100 may periodically detect supported functions and the device information may be updated accordingly. Timer IC 108 is configured to include a quartz oscillator or the like and measures current time.

Image forming apparatus MFP further includes an image scanner unit 112, an operation panel unit 114, a printing unit 116, a printer controller 118, and an output processing unit 120.

Image scanner unit 112 is a part for realizing the scanner function, at which a document is scanned and image data is generated. Typically, image scanner unit 112 includes a loading tray for setting the document, a platen glass, a feeding unit for feeding the document set on the loading tray to the platen glass one by one, and an ejection tray for ejecting the scanned document (all not shown). It is noted that image scanner unit 112 is not always necessary to realize the pull print configuration in accordance with the present invention.

Operation panel unit 114 includes ten-keys 130, a PRINT key 132, a log-off key 134, a touch panel 136 and a display unit 138 integrated together, and it is placed on a surface portion of image forming apparatus MFP. Ten-keys 130, PRINT key 132, log-off key 124 and touch panel 136 function as an input unit for receiving a user operation, and display unit 138 functions as a display for presenting screen images urging the user to make selection or determine various settings. Display unit 138 is typically implemented by a liquid crystal panel or the like, and touch panel 136 is arranged on the display surface of display unit 138.

Printing unit 116 is a part for performing the process of printing the image on paper medium, and it typically includes an image forming unit including an exposurer and a developing roller, a transfer roller for transferring the toner image formed by the image forming unit to the paper medium, a fixer for fixing the transferred toner image, and a control circuit controlling operation of these units.

Printer controller 118 converts print data from personal computer PC or image data scanned by image scanner unit 112 to data suitable for the print process at printing unit 116. Typically, when the image forming apparatus MFP is for color processing, printer controller 118 converts the print data or image data to raster data of four colors, that is, yellow (Y), magenta (M), cyan (C) and black (K), and outputs the raster data of respective colors to printing unit 116.

Output processing unit 120 is a part for processing the paper medium after the image is formed thereon by printing unit 116, and typically it performs the processes of "sort", "group", "staple" and "punch". Here, "sort" refers to a process in which, when a number of copies of a document containing a plurality of pages are to be output, sheets of paper having images formed in the same page order as the original document (collated sheets) are output by the set number of copies. "Group" refers to a process in which sheets of paper of the set number of copies are output grouped by page of the original document. "Staple" refers to a process of fastening the output sheets of paper by staples, and "punch" refers to a process of punching a hole or holes in the output sheets of paper.

Further, image forming apparatus MFP includes a hard disk unit (HDD: Hard Disk Drive) 110 and a network interface (I/F) unit 122.

Hard disk unit 110 is a storage unit for storing relatively large amount of data in a non-volatile manner, and it stores print data from personal computer PC and image data scanned by image scanner unit 112. Network interface unit 122 is a part for enabling data communication with personal computer PC or server SRV through the network NW.

(Hardware Configuration of Personal Computer and Server)

Figure 3:
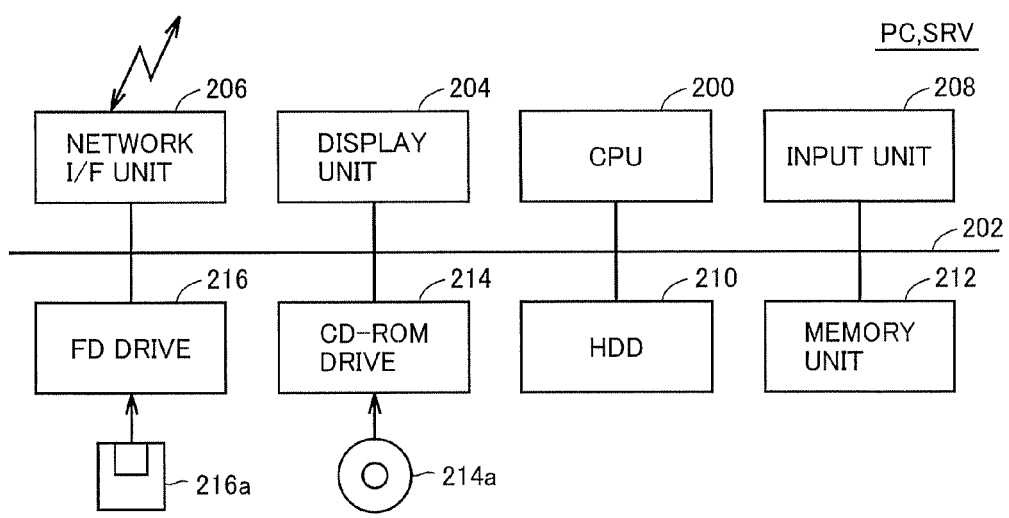
FIG. 3 schematically shows plain hardware configuration of the personal computer in accordance with Embodiment 1 of the present invention.

Referring to FIG. 3, personal computer PC in accordance with Embodiment 1 of the present invention includes a CPU 200 executing various programs including the operating system, a memory unit 212 temporarily storing data necessary for executing a program in CPU 200, and a hard disk unit 210 for storing the program to be executed by CPU 200 in a non-volatile manner. Such a program is read by a CD-ROM (Compact Disk-Read Only Memory) drive 214 or a flexible disk (FD) drive 216 from a CD-ROM 214a or a flexible disk 216a, respectively.

CPU 200 receives an operation request from the user through an input unit 208 implemented by a keyboard or a mouse, and provides a screen image output generated by execution of a program to a display unit 204. Further, CPU 200 performs data communication with server SRV or image forming apparatus MFP through network interface (I/F) unit 206 provided by an LAN card or the like. These parts are connected to each other through an internal bus 202.

The hardware configuration of server SRV is basically similar to that shown in FIG. 3 and, therefore, detailed description will not be repeated. In server SRV, the print data from personal computer PC is stored in hard disk unit 210.

(Overall Process Sequence of Image Forming System)

First, the overall process in the image forming system in accordance with the present embodiment will be described with reference to FIG. 4.

First, to an application program executed on personal computer PC, the user applies a print request by an operation of a mouse or the like (step S10), and then, personal computer PC transmits a request for information on print data output destination (step S12). In response to the request for output destination information, server SRV transmits output destination information including list information about image forming apparatuses that are capable of data communication with the server SRV, to the image forming apparatus MFP (step S14). The output destination information includes information representing state of supporting functions in each image forming apparatus MFP (device information) stored in advance in the server SRV. Then, based on the output destination information from server SRV, personal computer PC displays a list of selectable output destinations on a display unit 204 (step S16).

From the list of output destinations, the user selects a desired output destination by operating input unit 208 (step S18). In the specification, the "selection of output destination" includes selection of a specific one of the image forming apparatuses displayed in the list and no selection of any specific image forming apparatus that is, selection of all image forming apparatuses as the candidates of output destination. Dependent on the selection or non-selection of a specific output destination by the user, personal computer PC loads a corresponding printer driver from among at least one printer driver (instruction code) stored in advance to memory unit 212 or the like (step S20), and displays a print setting image allowing print setting, on display unit 204.

Further, the user sets each item (setting item) related to printing, by operating input unit 208 (step S22). Then, in accordance with the user setting, personal computer PC generates print data (step S24). Personal computer PC transmits the generated print data to server SRV (step S26). The print data additionally includes information representing selection or non-selection of the specific output destination by the user. Then, server SRV stores the print data from personal computer PC in hard disk unit 210 (step S28).

Next, the user operates operation panel unit 114 of image forming apparatus MFP and applies a pull print request (step S30), and then image forming apparatus MFP transmits a print list request to server SRV (step S32). In response to the print list request, server SRV transmits the list of stored print data to image forming apparatus MFP (step S34). When new print data from personal computer PC is stored, server SRV generates or updates the list of print data. The print data list includes information representing selection/non-selection of specific output destination by the user, in addition to document name and the like of each print data.

Image forming apparatus MFP has the print list from server SRV displayed on display unit 138 (step S36). The user selects desired print data, with reference to the print list displayed on display unit 138 (step S38). In response to the selection of print data by the user, image forming apparatus MFP transmits a print data request for specifying the selected print data to server SRV (step S40). In response to the print data request, server SRV transmits the specific print data among the stored print data to image forming apparatus MEP (step S42). Based on the print data from server SRV, image forming apparatus MFP executes the printing process (step S44). Through the above-described process procedure, the pull print process is finished.

In the following, the functional configuration and process procedure of each apparatus will be described in detail.

(Functional Configuration and Process Procedure of Personal Computer)

Figure 5:
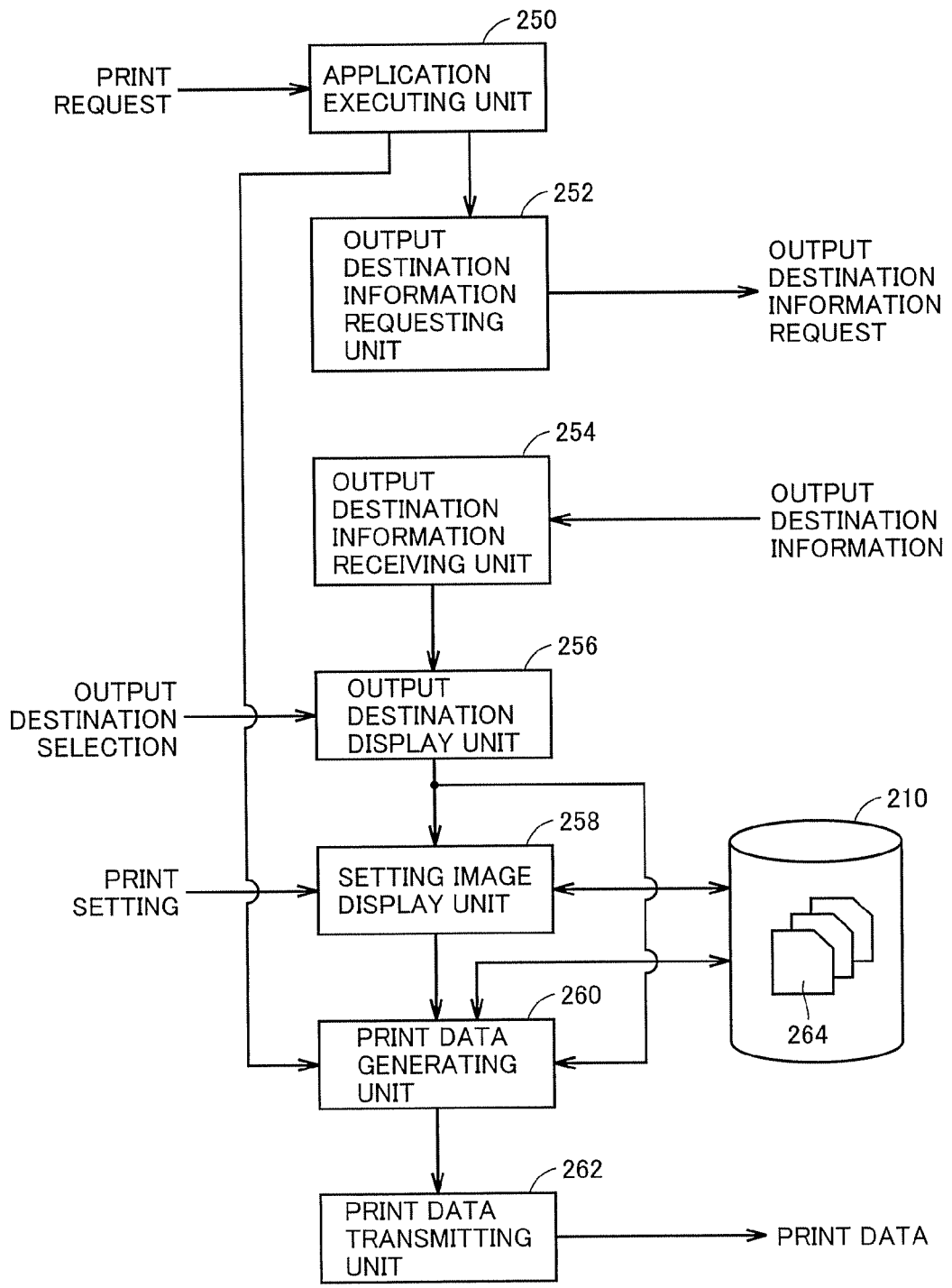
FIG. 5 is a block diagram representing functional configuration of a personal computer in accordance with Embodiment 1 of the present invention.

Referring to FIG. 5, personal computer PC in accordance with Embodiment 1 of the present invention includes an application executing unit 250, an output destination information requesting unit 252, an output destination information receiving unit 254, an output destination display unit 256, a setting image display unit 258, a print data generating unit 260, a print data transmitting unit 262 and a printer driver group 264, as its functions. Application executing unit 250, output destination information requesting unit 252, output destination information receiving unit 254, output destination display unit 256, setting image display unit 258, print data generating unit 260 and print data transmitting unit 262 are realized by CPU 200 reading a program stored in hard disk unit 210 or the like to memory unit 212 and executing the program. Printer driver group 264 is stored in advance in hard disk unit 210.

Application executing unit 250 typically executes an application program for performing the process of image creation or spread sheet, and executes various processes in accordance with an operation of input unit 208 (FIG. 3) by the user. Further, application executing unit 250 outputs a print instruction to output destination information requesting unit 252 and to print data generating unit 260 in response to a print request from the user (typically, selection of an icon displayed on display unit 204), and outputs a drawing instruction to print data generating unit 260.

In response to the print instruction output in response to the print request from the user, output destination information requesting unit 252 transmits a request for output destination information of the print data to server SRV.

Output destination information receiving unit 254 receives the output destination information from server SRV and outputs the received output destination information to output destination display unit 256. The output destination information includes, in addition to the information of the name and type of each image forming apparatus MFP, the state of supporting functions in each image forming apparatus MFP.

Output destination display unit 256 has a list of output destinations of print data displayed on display unit 204 (FIG. 3), based on the output destination information from output destination information receiving unit 254. Specifically, output destination display unit 256 displays to the user the list of image forming apparatuses MFP connected to server SRV in a manner allowing data communication.

Figure 6:
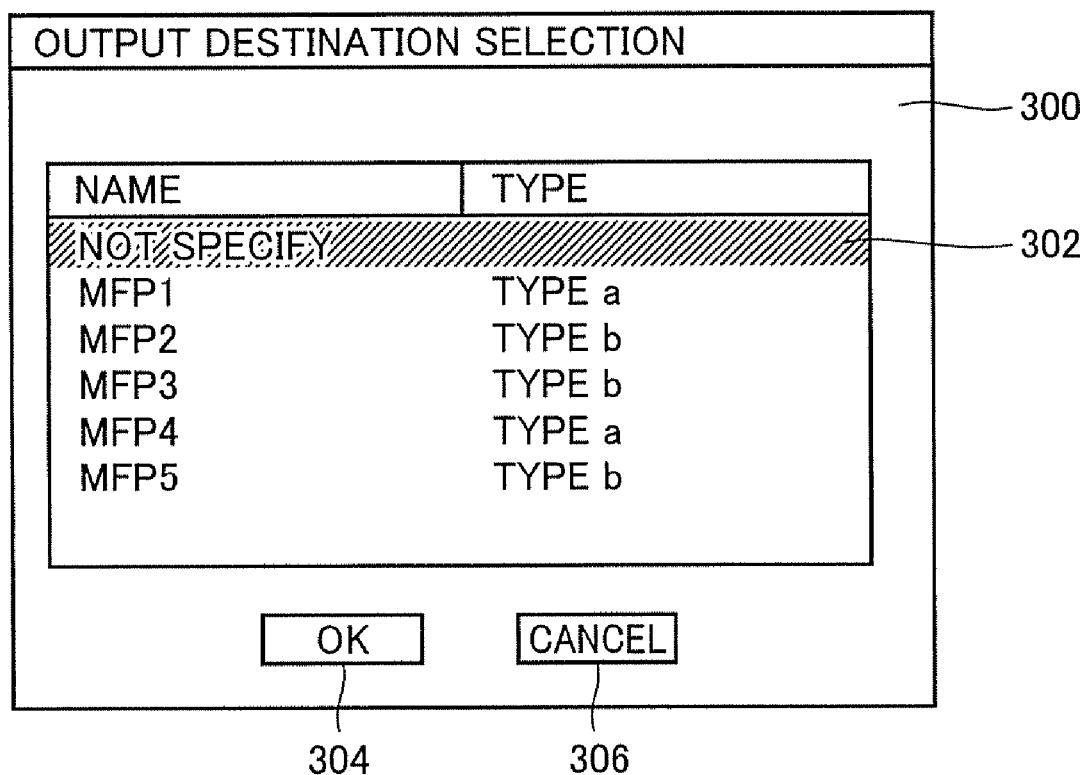
FIG. 6 shows an exemplary display of an output destination list of the print data in the personal computer in accordance with Embodiment 1 of the present invention.

FIG. 6 shows an exemplary list of output destinations of print data in the personal computer PC in accordance with Embodiment 1 of the present invention Referring to FIG. 6, output destination display unit 256 (FIG. 5) displays the list of output destinations of print data on display unit 204 and urges the user to select the output destination (designation of image forming apparatus MFP). Specifically, display unit 204 displays a list display image 300 having names and corresponding type names of respective image forming apparatuses MFP arranged, and a selection cursor 302 allowing the user to select the image forming apparatus MFP as the output destination. When the user selects a desired image forming apparatus by operating selection cursor 302 and selects "OK" button 304 thereafter, the output destination selection is complete. When "CANCEL" button 306 is selected, the output destination selecting process is cancelled.

By the list display image 300, it is possible to select a specific image processing apparatus (in the example of FIG. 6, one of "MFP1", "MFP2", "WFP3" . . . ) and it is also possible to select an item not selecting any specific image forming apparatus MFP (in the example of FIG. 6, "not specify"). Therefore, if the user has any image forming apparatus MFP intended in advance as the output destination, he/she selects the specific image forming apparatus MFP on the list display image 300. If the user does not mind which of the image forming apparatuses is used for output, the user selects the item "not specify" (does not select any specific image forming apparatus MFP).

Again referring to FIG. 5, output destination display unit 256 outputs information of output destination selection, input by the user by the operation of input unit 208 (FIG. 3) on list display image 300 shown in FIG. 6, to setting image display 258 and print data generating unit 260. The information of output destination includes the state of functions supported in the selected image forming apparatus MFP.

In accordance with the information of output destination selection from output destination display unit 256, setting image display unit 258 displays a print setting image allowing print setting, on display unit 204. Here, setting image display unit 258 selects, from a printer driver group 264 including at least one printer driver stored beforehand in hard disk unit 210, a corresponding printer driver based on the state of supported functions in the selected image forming apparatus MFP. By loading the selected printer driver to memory unit 212 or the like, setting image display unit 258 has the print setting image displayed on display unit 204. The printer driver is a kind of instruction code, and a prescribed function is realized by CPU 200 interpreting the instruction code. If a specific image forming apparatus MFP is not selected, a general purpose printer driver is selected. Here, the general purpose printer driver refers to a control code for displaying a print setting image including items that can be commonly executed by any of the image forming apparatuses on display unit 204, as will be described later.

Figure 7:
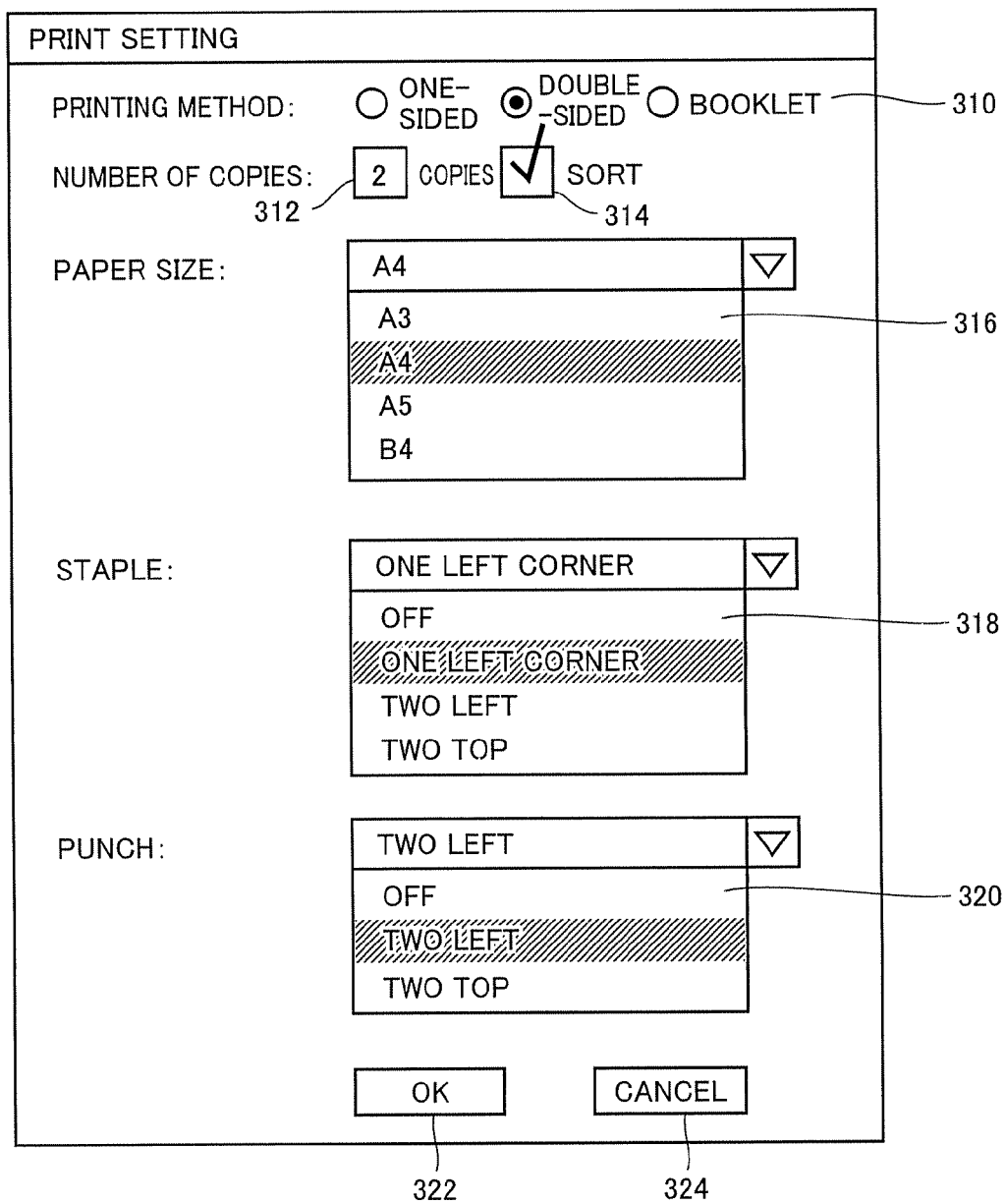
FIGS. 7 and 8 show exemplary displays of a print setting image in a personal computer in accordance with Embodiment 1 of the present invention.
Figures 8, 9A, 9B:
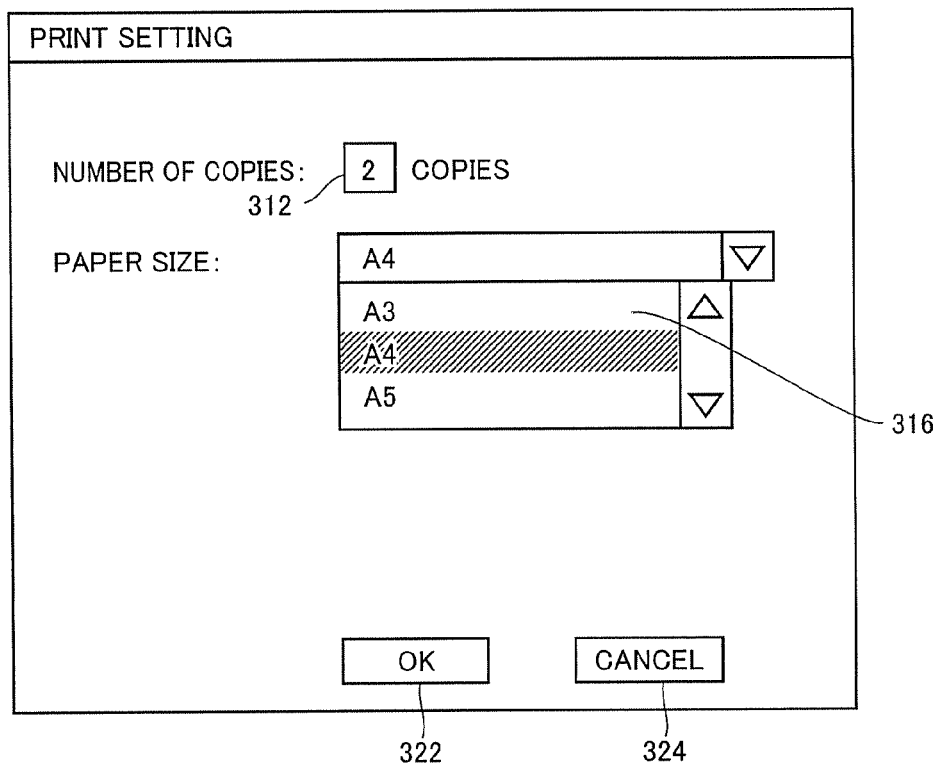
FIGS. 9A and 9B show examples of print data generated by the personal computer in accordance with Embodiment 1 of the present invention.

FIG. 7 shows an exemplary display of the print setting image when a specific image forming apparatus MFP is selected on the list display image 300 of FIG. 6, and FIG. 8 shows an exemplary display when a specific image forming apparatus MFP is not selected ("not specify" is selected) on the list display image 300 of FIG. 6.

Referring to FIG. 7, when a specific image forming apparatus MFP is selected as the output destination, setting image display unit 258 (FIG. 5) has the print setting image displayed on display unit 138 based on the information of the output destination selection and urges the user to perform print setting. Specifically, setting image display unit 258 displays a print setting image including items that depend on functions supported by the image forming apparatus MFP selected as the output destination. Specifically, on the print setting image, six setting items 310, 312, 314, 316, 318 and 320 of "printing method", "number of copies", "sort", "paper size", "staple" and "punch" are arranged, respectively. Here, as to the setting item 310 of "printing method", one of "one-sided", "double-sided" and "booklet" is selectable, and by the selection, one-sided printing, double-sided printing and booklet printing are designated, respectively. By the setting item "number of copies", the number of copies to be output from image forming apparatus MFP can be input arbitrarily. By the setting item 314 of "sort", whether sorting process is necessary or not at the time of output from image forming apparatus MFP can be set by checking the box. By setting item 316 of "paper size", setting of paper size for printing the image can be selected, by selecting one from a pull down menu. By the setting item 318 of "staple", one setting of a position where the sheets output from the image forming apparatus are fastened by the staple can be selected from the pull down menu. By the setting item 320 of "punch", one setting of a position, where a hole or holes is/are punched in the sheets output from the image forming apparatus, can be selected from the pull down menu.

Of these setting items, particularly, the "printing method", "sort", "staple" and "punch" depend on the functions supported by the image forming apparatus MFP.

In this manner, when a specific image forming apparatus MFP is selected, the setting image display unit 258 displays the print setting image that allows maximum use of functions supported by the selected image forming apparatus MFP.

On the contrary, referring to FIG. 8, when the specific image forming apparatus MFP is not selected (when "not specify" is selected), setting image display unit 258 has a print setting image including items that can commonly be executed by any of the image forming apparatuses MFP displayed on display unit 204. Specifically, by way of example, on the print setting image shown in FIG. 8, only two setting items 312 and 316 of "number of copies" and "paper size" are arranged. The print setting image shown in FIG. 8 corresponds to the print setting image shown in FIG. 7 with items "printing method", "sort", "staple" and "punch" that depend on the functions supported by the image forming apparatus MFP removed. Setting items "number of copies" and "paper size" are items that can be set commonly in any of the image forming apparatuses As described above, when a specific image forming apparatus MFP is not selected, setting image display unit 258 (FIG. 5) displays the print setting image to provide similar output result no matter which image forming apparatus MFP is used, regardless of the functions supported by respective image forming apparatuses.

In this manner, setting image display unit 258 (FIG. 5) changes the manner of display of the setting image dependent on whether the output destination is selected or not selected by the user.

Again referring to FIG. 5, setting image display unit 258 outputs print setting, input by the user operating the input unit 208 (FIG. 3) on the print setting image shown in FIG. 7 or FIG. 8, to print data generating unit 260.

In accordance with the print setting from setting image display unit 258, print data generating unit 260 generates print data in accordance with the drawing instruction from application executing unit 250. In generating the print data, print data generating unit 260 uses a printer driver corresponding to the information of output destination information from output destination display unit 256. Then, print data generating unit 260 outputs the generated print data to print data transmitting unit 262.

FIG. 9A shows print data corresponding to the print setting image shown in FIG. 7 and FIG. 9B shows the print data corresponding to the print setting image shown in FIG. 8.

The print data in accordance with the present embodiment is generated using PDL (Printer Description Language) as page description language designating character data to be output as well as information of corresponding font type and position of arrangement. Representative examples of PDL include PCL (Printer Command Language) and PostScript, and in FIGS. 9A and 9B, print data prepared by PCL is shown as an example.

Referring to FIG. 9A, the print data includes setting information 330 describing the print setting, and data body 338. Though data body 338 actually may include huge amount of control codes, it is shown in a simplified manner in FIG. 9A.

Setting information 330 consists of control codes each starting with "PJL (Print Job Language)", indicating that it is a print setting. By way of example, FIG. 9A shows seven lines of control codes 331 to 337. Control codes 331 to 337 describe "paper size", "number of copies", "necessity of double-sided printing", "necessity and position of stapling", "necessity of finisher process (sort)", "necessity of punching" and "designation of print language", respectively.

Referring to FIG. 9B, given the print setting image including only the items that can commonly be executed by any image forming apparatus as shown in FIG. 8, print data having relatively small contents in setting information 300 is generated.

Again referring to FIG. 5, print data generating unit 260 adds information representing selection or non-selection of a specific output destination by the user to the generated print data, and outputs the result to print data transmitting unit 262. Then, print data transmitting unit 262 transmits the print data with the information representing selection or non-selection of specific output destination added, to server SRV.

In this manner, personal computer PC transmits the print data including the print setting information set by the user, to server SRV.

As to the correspondence between various functional blocks shown in FIG. 5 and the present invention, output destination information requesting unit 252 corresponds to the "output destination information requesting unit", output destination display unit 256 corresponds to the "output destination display unit", setting image display unit 258 corresponds to the "setting image display unit", print data generating unit 260 corresponds to the "print data generating unit", and print data transmitting unit 262 corresponds to the "print data transmitting unit."

FIG. 10 shows process procedure related to print data generation in the personal computer PC in accordance with Embodiment 1 of the present invention.

Referring to FIGS. 3, 5 and 10, first, when the user turns on the power of personal computer PC, personal computer PC is activated and initialization takes place (step S100). Initialization includes general processes such as clearing of memory unit 212, loading of the OS to memory unit 212, execution of the OS by CPU 200 and setting of initial values (default values). After the end of initialization, CPU 200 determines whether there is any input event (operation request) occurred by a user operation through input unit 208 (step S102). If there is no input event occurred (NO at step S102), CPU 200 waits until any input event occurs (step S102).

If there is any input event occurred (YES at step S102), CPU 200 determines whether the occurred event is a print request or not (step S104). If the occurred event is not a print request (NO at step S104), a process in accordance with the request is executed (step S106). After execution of the process, CPU 200 again waits until occurrence of any input event (step S102).

If the occurred event is a print request (YES at step S104), CPU 200 functioning as output destination information requesting unit 252 transmits a request for output destination information of the print data to server SRV (step S107). Thereafter, CPU 200 functioning as output destination information receiving unit 254 waits until the output destination information is received from server SRV (step S108). Receiving the output destination information from server SRV, CPU 200 functioning as output destination display unit 256 has the list of print data output destinations displayed on display unit 204, based on the output destination information from output destination information receiving unit 254. Specifically, output destination display unit 256 displays to the user a list of image forming apparatuses MFP connected to allow data communication with server SRV (step S110).

Then, CPU 200 functioning as output destination display unit 256 determines whether "OK" button 304 or "CANCEL" button 306 is selected for the list display image 300 shown in FIG. 6 (step S112). If neither "OK" button 304 nor "CANCEL" button 306 is selected (NO at step S112), CPU 200 waits until the "OK" button 304 or "CANCEL" button 306 is selected (step S112).

When "OK" button 304 is selected ("OK" at step S112), CPU 200 functioning as setting image display unit 258 determines whether a specific image forming apparatus MFP has been selected as the output destination based on the output selection by the user or not (step S114). If a specific image forming apparatus MFP has been selected as the output destination (YES at step S114), CPU 200 reads, from the printer driver group 264, the printer driver that corresponds to the selected image forming apparatus MFP, and loads it to memory unit 212 or the like (step S116). On the contrary, if no specific image forming apparatus has been selected as the output destination (NO at step S114), CPU 200 reads a general purpose printer driver from printer driver 264, and loads it to memory unit 212 or the like (step S118).

Then, CPU 200 functioning as setting image display unit 258 displays the print setting image on display unit 204 (step S120).

When "CANCEL" button 306 is selected ("CANCEL" at step S112), the process returns to step S102.

Further, CPU 200 functioning as setting image display unit 258 determines whether "OK" button 322 or "CANCEL" button 324 has been selected on the print setting image shown in FIG. 7 or 8 (step S122). If neither "OK" button 322 nor "CANCEL" button 324 is selected (NO at step S122), CPU 200 waits until "OK" button 322 or "CANCEL" button 324 is selected (step S122).

When "OK" button 322 is selected ("OK" at step S122), CPU 200 functioning as print data generating unit 260 generates print data based on the print setting set by the user (step S124). Then, CPU 200 functioning as print data transmitting unit 262 transmits the generated print data to server SRV (step S126). Then, the process returns to step S102.

When "CANCEL" button 324 is selected ("CANCEL" at step S122), the process returns to step S102.

(Functional Configuration and Process Procedure of Server)

Figure 11:
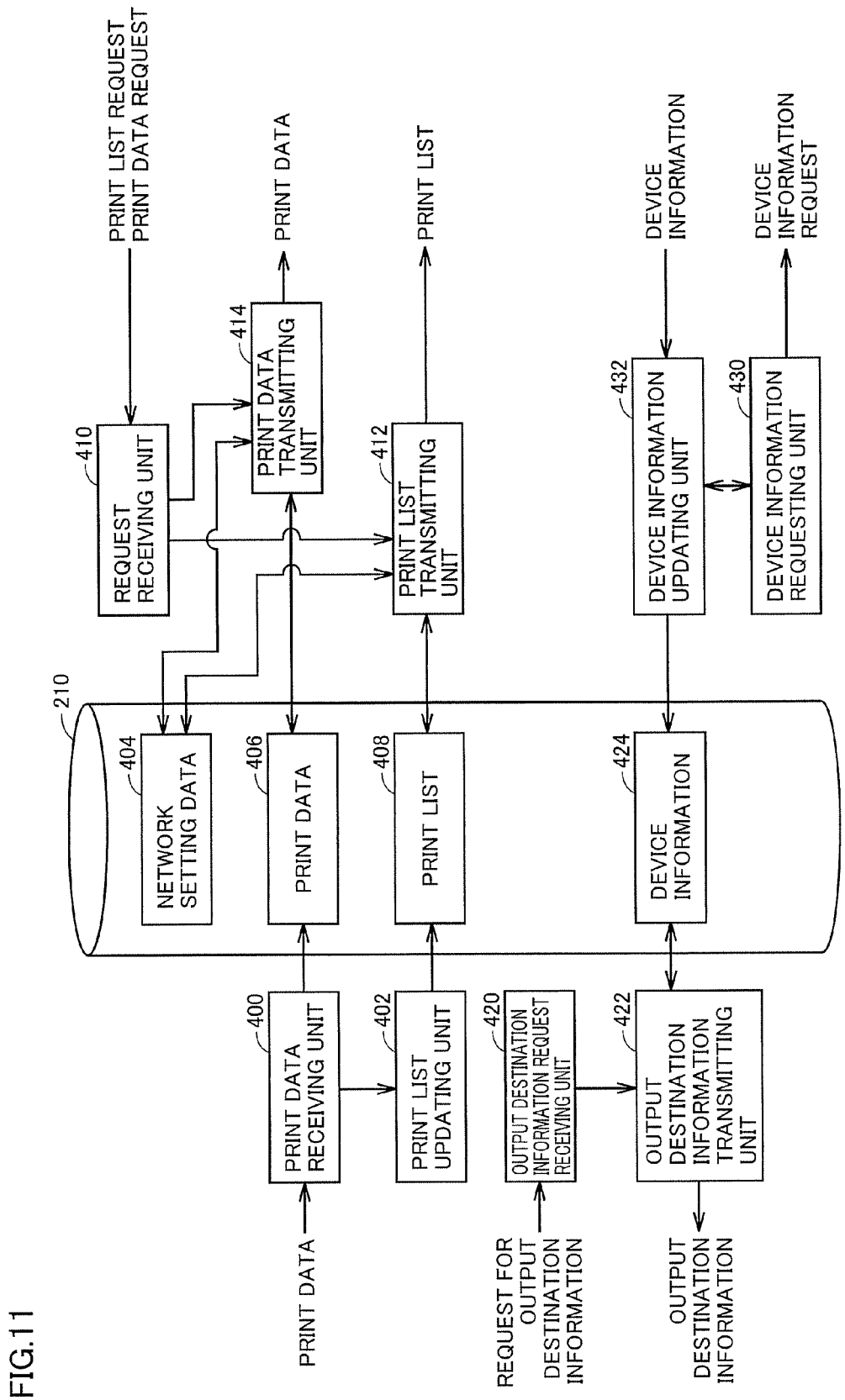
FIG. 11 is a block diagram representing functional configuration of the server in accordance with Embodiment 1 of the present invention.

Referring to FIG. 11, server SRV in accordance with Embodiment 1 of the present invention includes a print data receiving unit 400, a print list updating unit 402, a network setting data storage unit 404, a print data storage unit 406, a print list storage unit 408, a request receiving unit 410, print list transmitting unit 412, print data transmitting unit 414, output destination information request receiving unit 420, output destination information transmitting unit 422, device information storage unit 424, device information requesting unit 430, and device information updating unit 432, as its functions. Print data receiving unit 400, print list updating unit 402, request receiving unit 410, print list transmitting unit 412, print data transmitting unit 414, output destination information request receiving unit 420, output destination information transmitting unit 422, device information requesting unit 430 and device information updating unit 432 are realized by CPU 200 reading a program stored beforehand in hard disk unit 210 or the like to memory unit 212 and executing the program. Further, network setting data storage unit 404, print data storage unit 406, print list storage unit 408 and device information storage unit 424 are formed in a prescribed area of hard disk unit 210.

Print data receiving unit 400 receives print data from personal computer PC, and stores the received print data in print data storage unit 406. Further, print data receiving unit 400 outputs information including document name, designated output destination, transmission source, data size and the like of the received print data, to print list updating unit 402. Print list updating unit 402 newly generates the list of print data (print list) or updates existing print list, based on the information from print data receiving unit 400. Then, print list updating unit 402 stores the generated or updated print list in print list storage unit 408.

FIG. 12 shows an example of data structure stored in print list storage unit 408 of the server SRV in accordance with Embodiment 1 of the present invention.

Referring to FIG. 12, print list updating unit 402 allocates job IDs as identification numbers successively to the print data received from personal computer PC, and obtains document names (file names) and designated output destination. Then, print list updating unit 402 stores in the form of a list, the job IDs, the corresponding document names, and the output destinations in print list storage unit 408.

Again referring to FIG. 11, network setting data storage unit 404 stores network setting information of the image forming apparatus MFP capable of data communication with server SRV. Specifically, network setting data storage unit 404 stores network address (typically, IP address) of each image forming apparatus MFP, and these pieces of information are set beforehand.

FIG. 13 shows an example of data structure stored in network setting data storage unit 404 of the server SRV in accordance with Embodiment 1 of the present invention.

Referring to FIG. 13, network setting data storage unit 404 stores the IP address and the machine type, in correspondence with the name of each image forming apparatus MFP capable of data communication with the server SRV. The print list transmitting unit 412 and print data transmitting unit 414, which will be described later, obtain the data transmission destination based on these pieces of information stored in network setting data storage unit 404.

Again referring to FIG. 11, request receiving unit 410 receives a request transmitted from any of the image forming apparatuses MFP, and determines whether the received request is a print list request or a print data request. When the print list request is received, request receiving unit 410 outputs the print list request to print list transmitting unit 412, and when the print data request is received, the request receiving unit 410 outputs the print data request to print data transmitting unit 414. When outputting the print list request or the print data request, request receiving unit 410 also outputs information for specifying the image forming apparatus MFP as the source of transmission of the corresponding request.

In response to the print list request from request receiving unit 410, print list transmitting unit 412 reads the print list from print list storage unit 408, and transmits the read print list to image forming apparatus MFP as the source of request transmission.

In response to the print data request from request receiving unit 410, print data transmitting unit 414 reads the print data specified by the print data request from print data storage unit 406. Then, print data transmitting unit 414 transmits the read print data to the image forming apparatus MFP as the source of request transmission.

Output destination information request receiving unit 420 receives the request for output destination information from personal computer PC and outputs the received output destination information request to output destination information transmitting unit 422.

In response to the request for output destination information from output destination information request receiving unit 420, output destination information transmitting unit 422 reads the device information of each image forming apparatus MFP from device information storage unit 424, and transmits the read device information as the output destination information to the image forming apparatus as the source of request transmission.

FIG. 14 shows an example of data structure stored in device information storage unit 424 of server SRV in accordance with Embodiment 1 of the present invention.

Referring to FIG. 14, device information storage unit 424 stores, by way of example, the state of functions supported by each of the image forming apparatuses MFP capable of data communication with server SRV, in the form of a list. Specifically, device information storage unit 424 stores, in correspondence to each of a plurality of functions that can be implemented in the image forming apparatus MFP, the value "Y" indicating that the function is supported or the value "N" indicating that the function is not supported.

The contents of device information of each image forming apparatus MFP stored in advance in device information storage unit 424 may be manually updated, for example, when an image forming apparatus MFP is newly connected to the network. As regards the server SRV and the image forming apparatuses MFP in accordance with the present embodiment, by way of example, a configuration is adopted in which the server asks each image forming apparatus MFP for the device information. Specifically, device information requesting unit 430 and device information updating unit 432 realize these functions. Device information requesting unit 430 transmits a device information request to each image forming apparatus MFP at every prescribed interval or at a timing of occurrence of some event. Broadcast transmission of the device information request is preferable. Device information updating unit 432 receives the device information transmitted from each image forming apparatus MFP in response to the device information request from device information requesting unit 430, and successively updates the contents of information storage unit 424 based on the received device information, as will be described later.

As to the correspondence between various functional blocks shown in FIG. 11 and the present invention, output destination information transmitting unit 422 corresponds to the "output destination information transmitting unit", print data storage unit 406 corresponds to the "print data storage unit", print list transmitting unit 412 corresponds to the "list transmitting unit", and print data transmitting unit 414 corresponds to the "print data transmitting unit".

Figure 15:
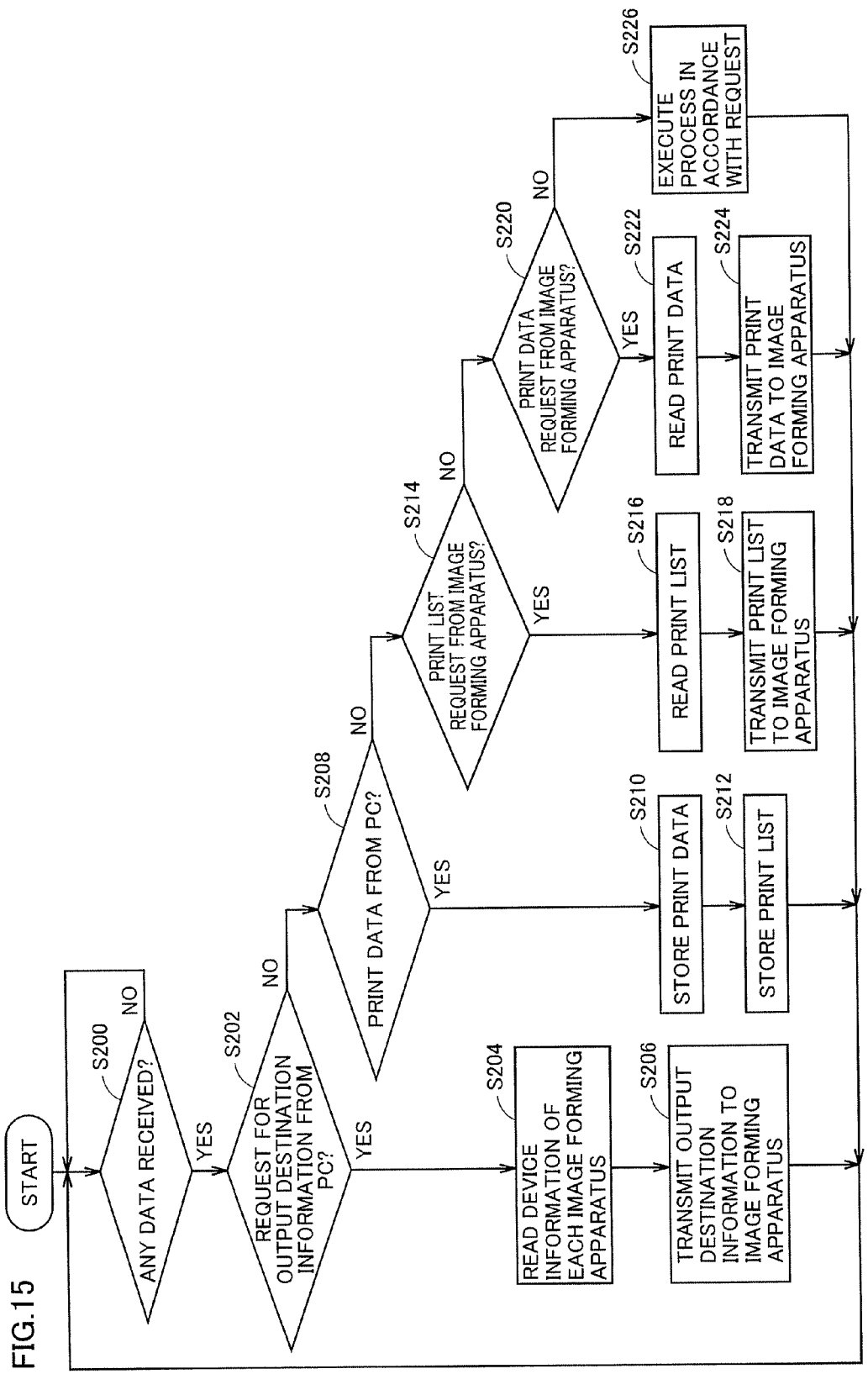
FIG. 15 is a flowchart representing process procedure in the server in accordance with Embodiment 1 of the present invention.

FIG. 15 shows process procedure in the server SRV in accordance with Embodiment 1 of the present invention.

Referring to FIGS. 3, 11 and 15, first, CPU 200 functioning as print data receiving unit 400, request receiving unit 410 and output destination information request receiving unit 420 determines whether any data is received through network interface unit 206 or not (step S200). If no data has been received (NO at step S200), CPU 200 waits until any data is received (step S200).

When any data is received (YES at step S200), CPU 200 determines whether the received data is a request for output destination information from personal computer PC or not (step S202). If the received data is the request for output destination information from personal computer PC (YES at step S202), CPU 200 functioning as output destination information transmitting unit 422 reads device information of each image forming apparatus MFP from device information storage unit 424 in hard disk unit 210 (step S204). Then, CPU 200 functioning as output destination information transmitting unit 422 transmits the read device information as the output destination information to the image forming apparatus MFP as the source of request transmission (step S206). Then, the process returns to step S200.

If the received data is not the request for output destination information from personal computer PC (NO at step S202), CPU 200 determines whether the received data is print data from personal computer PC or not (step S208). If the received data is print data from the personal computer PC (YES at step S208), CPU 200 functioning as print data receiving unit 400 stores the received print data in print data storage unit 406 in hard disk unit 210 (step S210). Thereafter, CPU 200 functioning as print list updating unit 402 newly generates or updates the print list, and stores the generated or updated print list in print list storage unit 408 (step S212). Then, the process returns to step S200.

If the received data is not the print data from personal computer PC (NO at step S208), CPU 200 determines whether the received data is a print list request from image forming apparatus MFP or not (step S214). If the received data is a print list request from image forming apparatus MFP (YES at step S214), CPU 200 functioning as print list transmitting unit 412 reads the print list from print list storage unit 408 in hard disk unit 210 (step S216). Then, CPU 200 functioning as print list transmitting unit 412 transmits the read print list to the image forming apparatus MFP as the source of request transmission, together with the read print list (step S218). Then, the process returns to step S200.

If the received data is not the print list request from image forming apparatus MFP (NO at step S214), CPU 200 determines whether the received data is a print data request from image forming apparatus MFP or not (step S220). If the received data is print data request from image forming apparatus MFP (YES at step S220), CPU 200 functioning as print data transmitting unit 414 reads the print data specified by the print data request, from print data storage unit 406 in hard disk unit 210 (step S222). Then, CPU 200 functioning as print data transmitting unit 414 transmits the read print data to image forming apparatus MFP as the source of request transmission (step S224). Then, the process returns to step S200.

If the received data is not the print data request from image forming apparatus MFP (NO at step S220), CPU 200 executes a process corresponding to the received request (step S226), and the process returns to step S200.

(Functional Structure and Process Procedure in Image Forming Apparatus)

Figure 16:
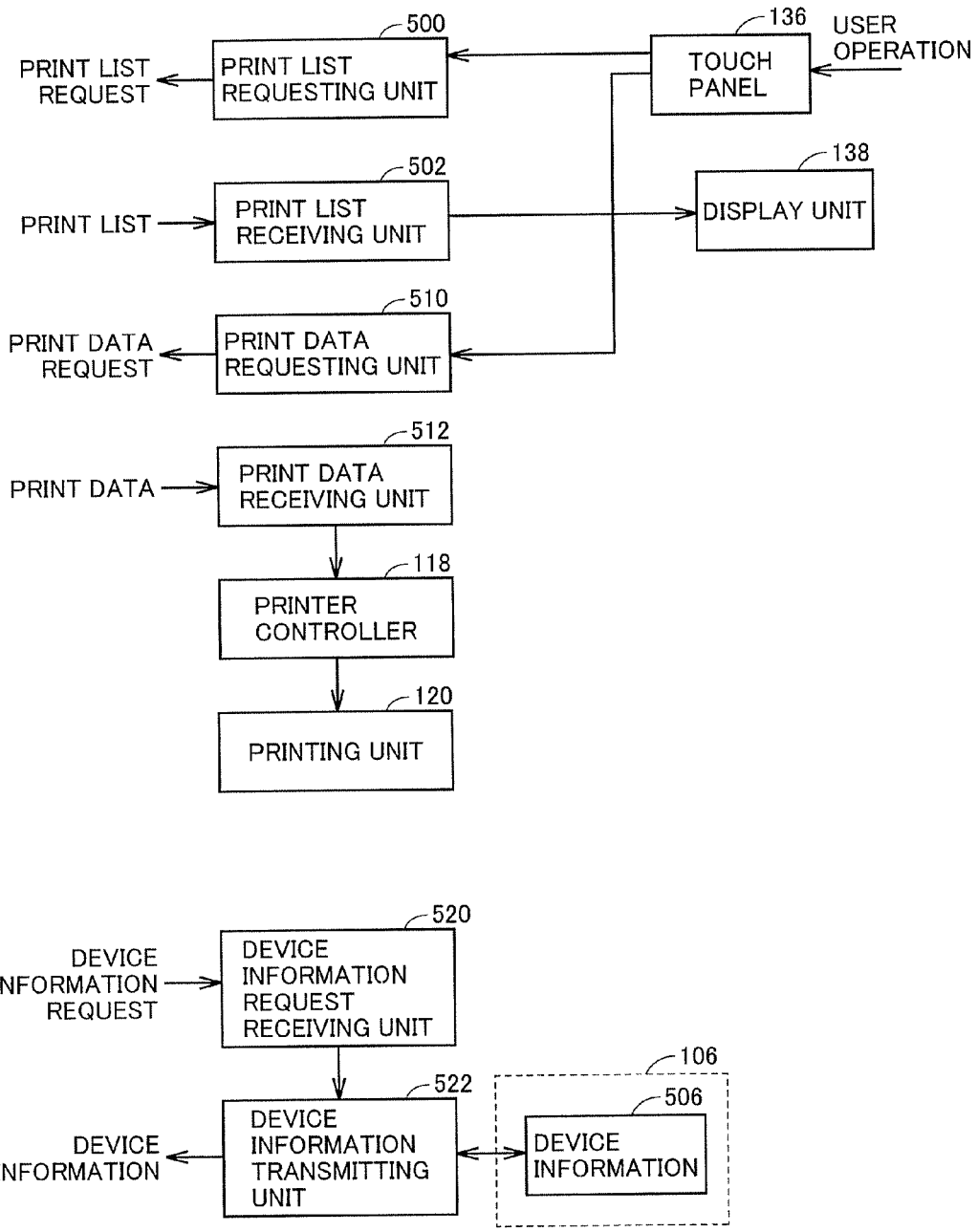
FIG. 16 is a block diagram representing functional configuration of an image forming apparatus in accordance with Embodiment 1 of the present invention.

Referring to FIG. 16, image forming apparatus MFP in accordance with Embodiment 1 of the present invention includes a print list requesting unit 500, a print list receiving unit 502, a print data requesting unit 510, a print data receiving unit 512, device information request receiving unit 520, device information transmitting unit 522, and device information storage unit 506, as its functions. These units except for the device information storage unit 506 are realized by CPU 100 reading a program stored in advance in ROM 102 or the like to S-RAM 104 and executing the program. Device information storage unit 506 is formed in a prescribed area of NV-RAM 106.

Print list requesting unit 500 transmits the print list request to server SRV in accordance with an operation of touch panel 136 by the user. Print list receiving unit 502 receives the print list from server SRV, and has the received print list displayed on display unit 138.

Figure 17:
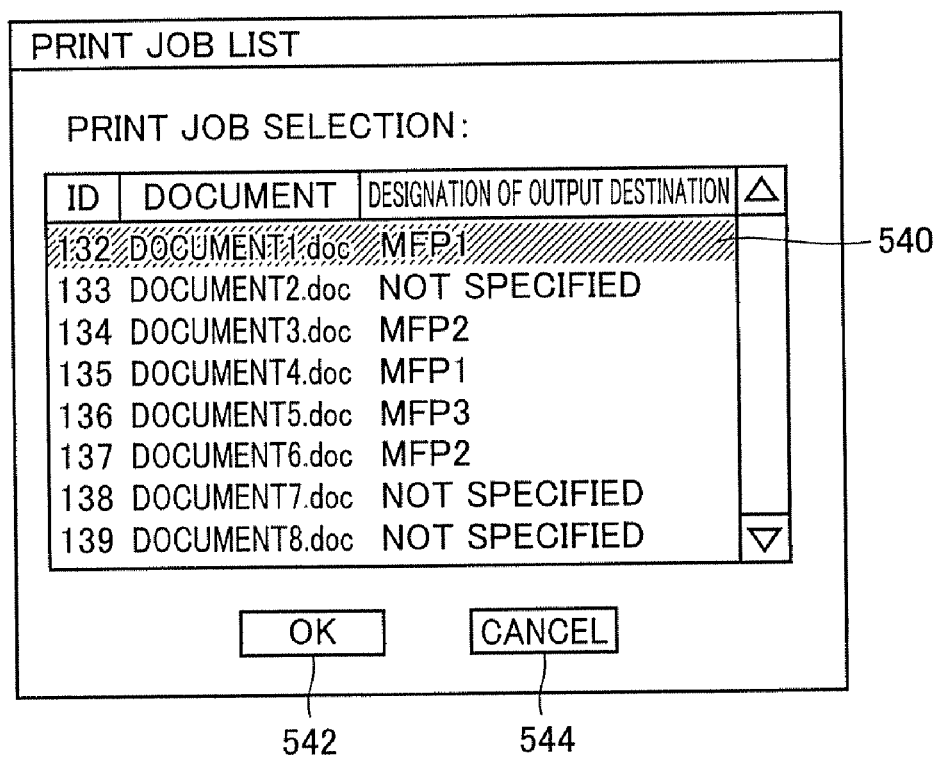
FIG. 17 shows an exemplary display of the print list in the image forming apparatus in accordance with Embodiment 1 of the present invention.

FIG. 17 shows an exemplary display of the print list in the image forming apparatus MFP in accordance with Embodiment 1 of the present invention.

Referring to FIG. 17, print list receiving unit 502 (FIG. 16) has the print data stored in server SRV displayed as a list on display unit 138, and urges the user to select the print data. Specifically, display unit 138 displays the document name of each print data and the corresponding output destination in the order of job ID, and displays a selection cursor 540 to allow the user to select print data as the object of printing. Then, the user selects the desired print data by operating the selection cursor 540 and selects "OK" button 542, whereby selection of print data is finished. If "CANCEL" button 544 is selected, the pull print process is canceled, and subsequent printing process is not executed.

Again referring to FIG. 16, print data requesting unit 510 transmits, in accordance with the operation of touch panel 136 by the user as shown in FIG. 17, a print data request for specifying the selected print data to server SRV. By way of example, the value of "job ID" is used for specifying the print data.

Receiving the print data from server SRV, print data receiving unit 512 outputs the received print data to printer controller 118. Printer controller 118 and printing unit 116 execute printing process based on the print data from print data receiving unit 512. Then, paper medium having the print data desired by the user printed thereon is output from the image forming apparatus MFP.

Device information request receiving unit 520 and device information transmitting unit 522 are functional configurations for successively updating the contents of device information storage unit 424 (FIG. 14) of server SRV. Specifically, device information request receiving unit 520 receives a device information request from the server SRV, and outputs the received device information request to device information transmitting unit 522. Device information transmitting unit 522 reads device information stored in advance in device information storage unit 506, and transmits the read device information to server SRV.

As to the correspondence between various functional blocks shown in FIG. 16 and the present invention, print list requesting unit 500 corresponds to the "list requesting unit", display unit 138 corresponds to the "display unit", print data requesting unit 510 corresponds to the "data requesting unit", and printing unit 116 corresponds to the "processing unit."

Figure 18:
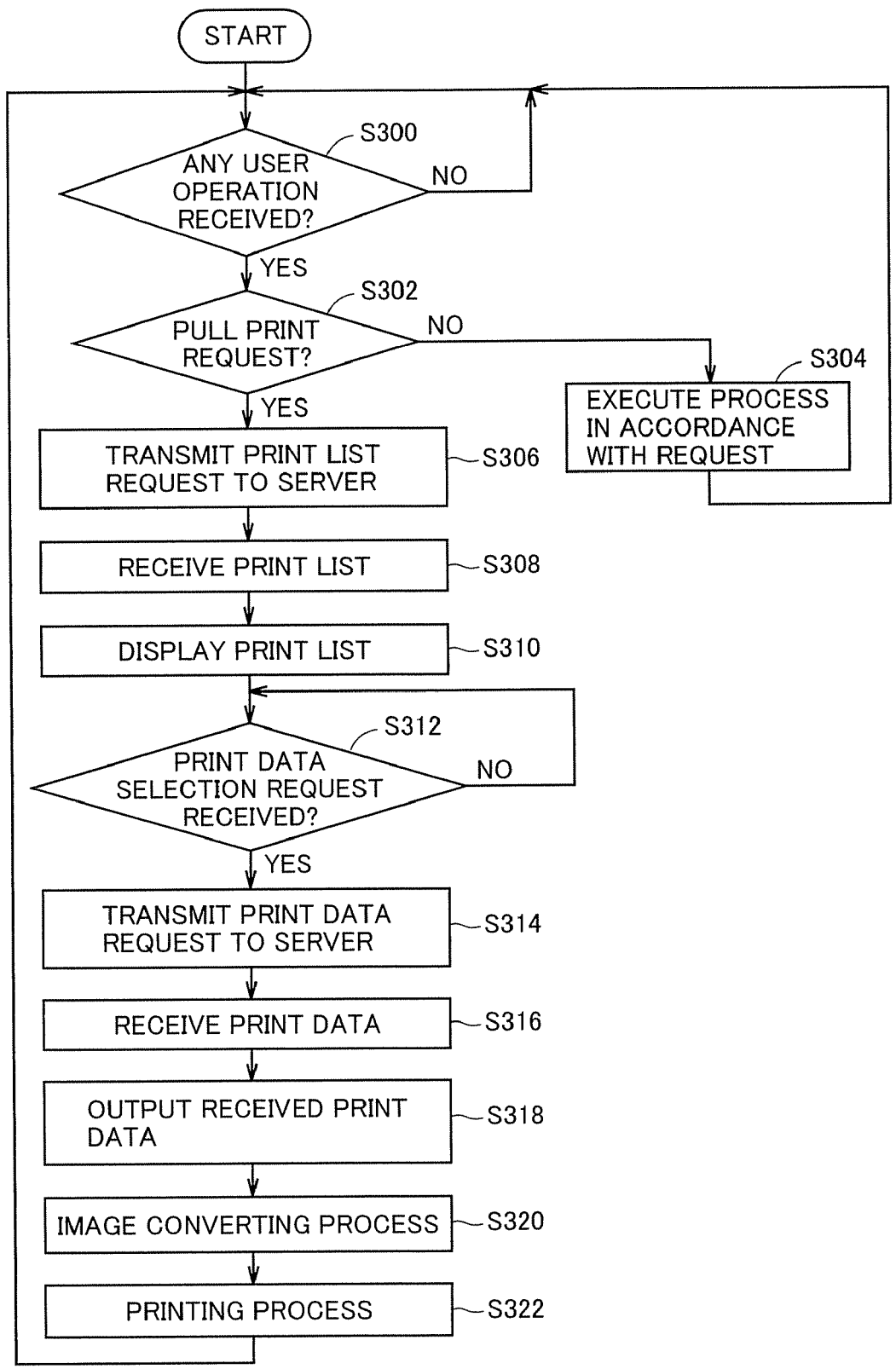
FIG. 18 is a flowchart representing process procedure in the image forming apparatus in accordance with Embodiment 1 of the present invention.

FIG. 18 shows process procedure in the image forming apparatus MFP in accordance with Embodiment 1 of the present invention.

Referring to FIGS. 2, 13 and 18, first, CPU 100 determines whether any user operation is received through touch panel 136 or not (step S300). If no user operation has been received (NO at step S300), CPU 100 waits until any user operation is received (step S300).

If any user operation is received (YES at step S300), CPU 100 determines whether the received user operation is a pull print request or not (step S302). If the received user operation is not the pull print request (NO at step S302), CPU executes a process corresponding to the request (step S304). Then, the process returns to step S300.

If the received user operation is a pull print request (YES at step S302), CPU 100 functioning as print list requesting unit 500 transmits the print list request to server SRV (step S306). Thereafter, CPU 100 functioning as print list receiving unit 502 waits until the print list is received from server SRV (step S308). Receiving the print list from server SRV, CPU 100 functioning as print list receiving unit 502 has the received print list displayed on display unit 138 (step S310).

Thereafter, CPU 100 functioning as print data requesting unit 510 determines whether any request for selecting print data from the user through touch panel 136 has been received or not (step S312). If no request has been received (NO at step S312), CPU 100 waits until a print data selection request is received (step S312).

When a print data selection request from the user is received (YES at step S312), CPU 100 transmits, in response to the selection request, a print data request for specifying the selected print data to server SRV (step S314). Then, CPU 100 functioning as print data receiving unit 512 waits until the print data is received from server SRV (step S316).

Receiving the print data from server SRV, CPU 100 functioning as print data receiving unit 512 outputs the received print data to printer controller 118 (step S318).

Printer controller 118 performs a prescribed image converting process based on the print data from CPU 100, and outputs the processed data (e.g. raster data) to printing unit 116 (step S320). Then, based on the raster data from printer controller 118, printing unit 116 prints the image on paper medium and outputs the result (step S322). Then, the process returns to step S300.

According to Embodiment 1 of the present invention, when the user inputs a print request to the information processing apparatus, a list of image forming apparatuses as output destinations is displayed on the personal computer PC in accordance with the present embodiment, urging the user to select. When the user selects a specific image forming apparatus as the output destination, the personal computer PC loads the printer driver that corresponds to the selected image forming apparatus, whereby a print setting image allowing maximum use of functions supported by the selected image forming apparatus is displayed. On the contrary, if the user does not select any specific image forming apparatus, the personal computer PC loads a general purpose printer driver, whereby a print setting image consisting of items that can be commonly executed by any image forming apparatus is displayed.

Accordingly, no matter whether the user selects a specific image forming apparatus as the output destination or the user does not select any specific image forming apparatus, it is possible to generate appropriate print data.

Further, according to Embodiment 1 of the present invention, if the user operates the image forming apparatus to execute the pull print process, information indicating selection or non-selection of a specific output destination by the user is displayed in correspondence to the print data, when the print data is generated. Therefore, it is possible to prevent the user from erroneously outputting the print data intended for a specific image forming apparatus from a different image forming apparatus.

Embodiment 2

In Embodiment 1 above, a configuration has been described in which the printer driver is selectively loaded dependent on selection/non-selection of an image forming apparatus as the output destination, to change the manner of display of print setting image. In the present embodiment, a configuration will be described in which the manner of display of the print setting image is changed while using a common printer driver.

The overall configuration of the image forming system in accordance with the present embodiment is similar to that of FIG. 1 described above and, therefore, detailed description will not be repeated. Further, hardware configurations of the personal computers, server and image forming apparatuses forming the image forming system are also the same as those of FIGS. 2 and 3 above and, therefore, detailed description will not be repeated.

(Overall Process Sequence of Image Forming System)

First, referring to FIG. 19, the overall process in the image forming system in accordance with the present embodiment will be described.

Figure 4:
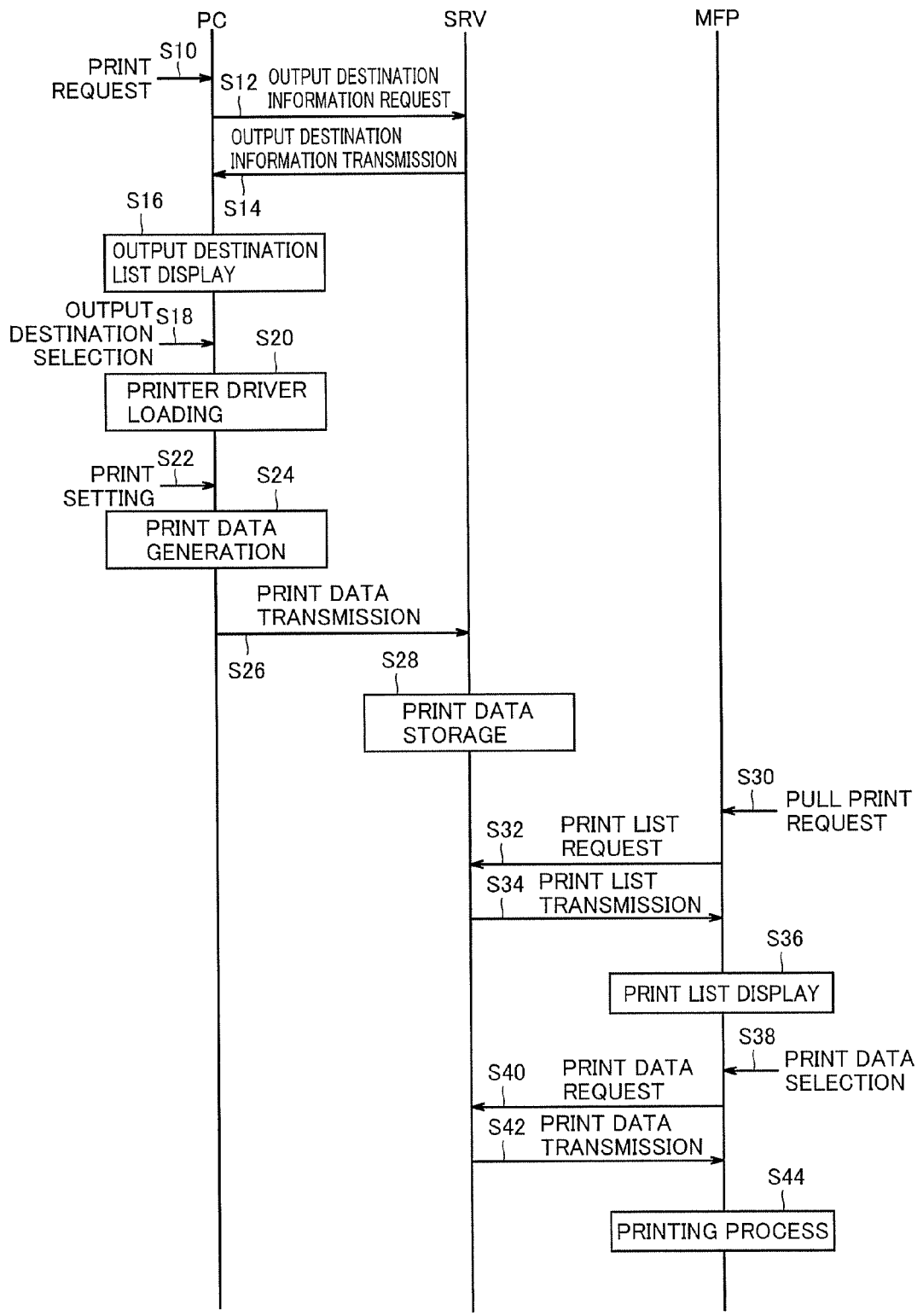
FIG. 4 is a sequence diagram representing the overall process procedure in the image forming system in accordance with Embodiment 1 of the present invention.
Figure 19:
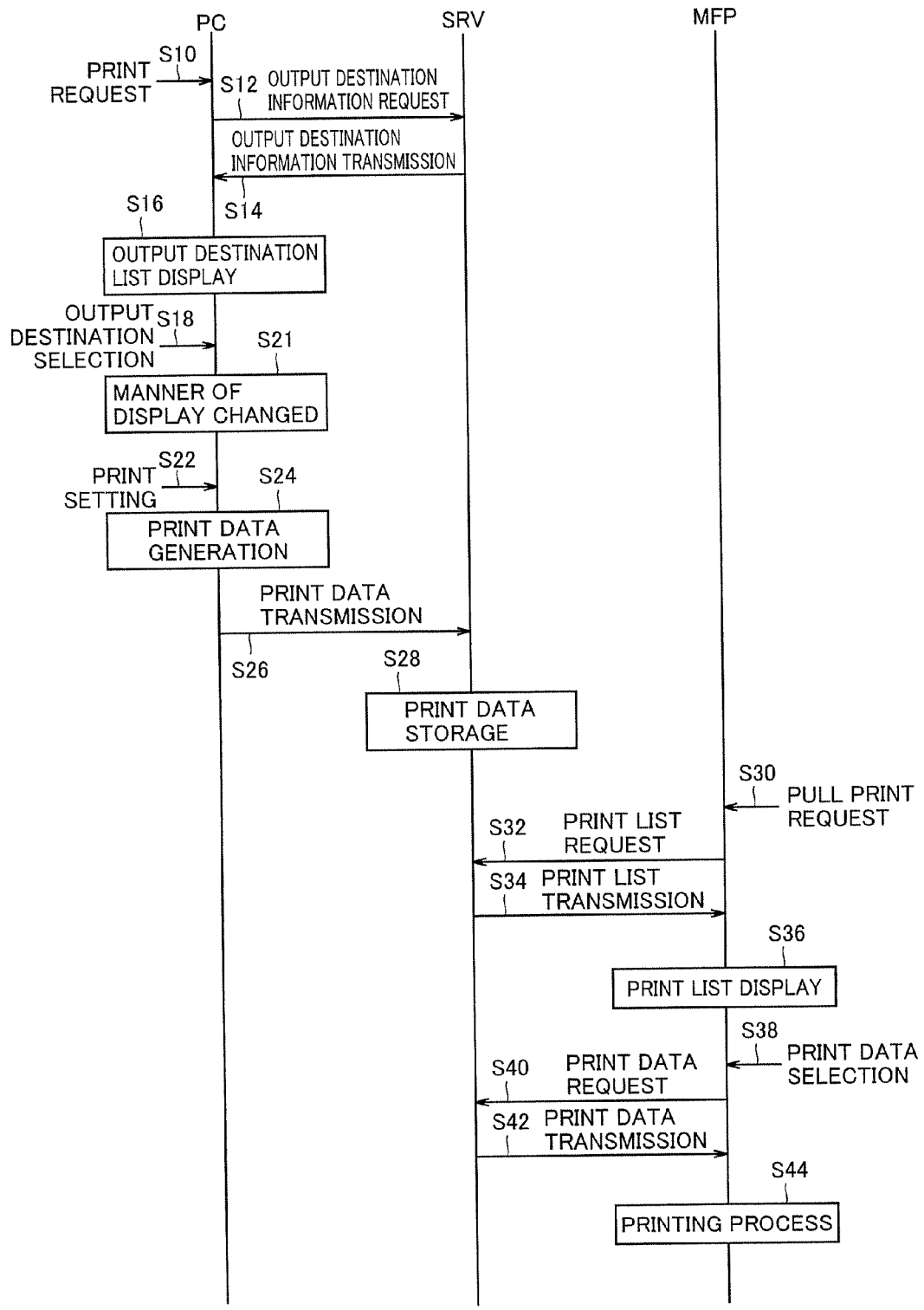
FIG. 19 is a sequence diagram representing an overall process procedure in the image forming system in accordance with Embodiment 2 of the present invention.

Referring to FIG. 19, the overall process sequence of the image forming system in accordance with the present embodiment corresponds to the overall process sequence of the image forming system in accordance with Embodiment 1 shown in FIG. 4 with step S20 changed to step S21. Specifically, personal computer PC loads the printer driver (or instruction code) to memory unit 212 or the like in advance, and at step S21, dependent on selection or non-selection of the output destination by the user, the manner of display of selectable setting items and the like is changed. Except for this process, the sequence is the same as that of FIG. 4 and, therefore, detailed description will not be repeated.

The functional configurations of respective apparatuses to realize the overall process sequence as such are the same as those of Embodiment 1 described above, except for the functional configuration of personal computer PC. Therefore, in the following, the functional configuration of personal computer PC will be described.

(Functional Configuration of Personal Computer)

Figure 20:
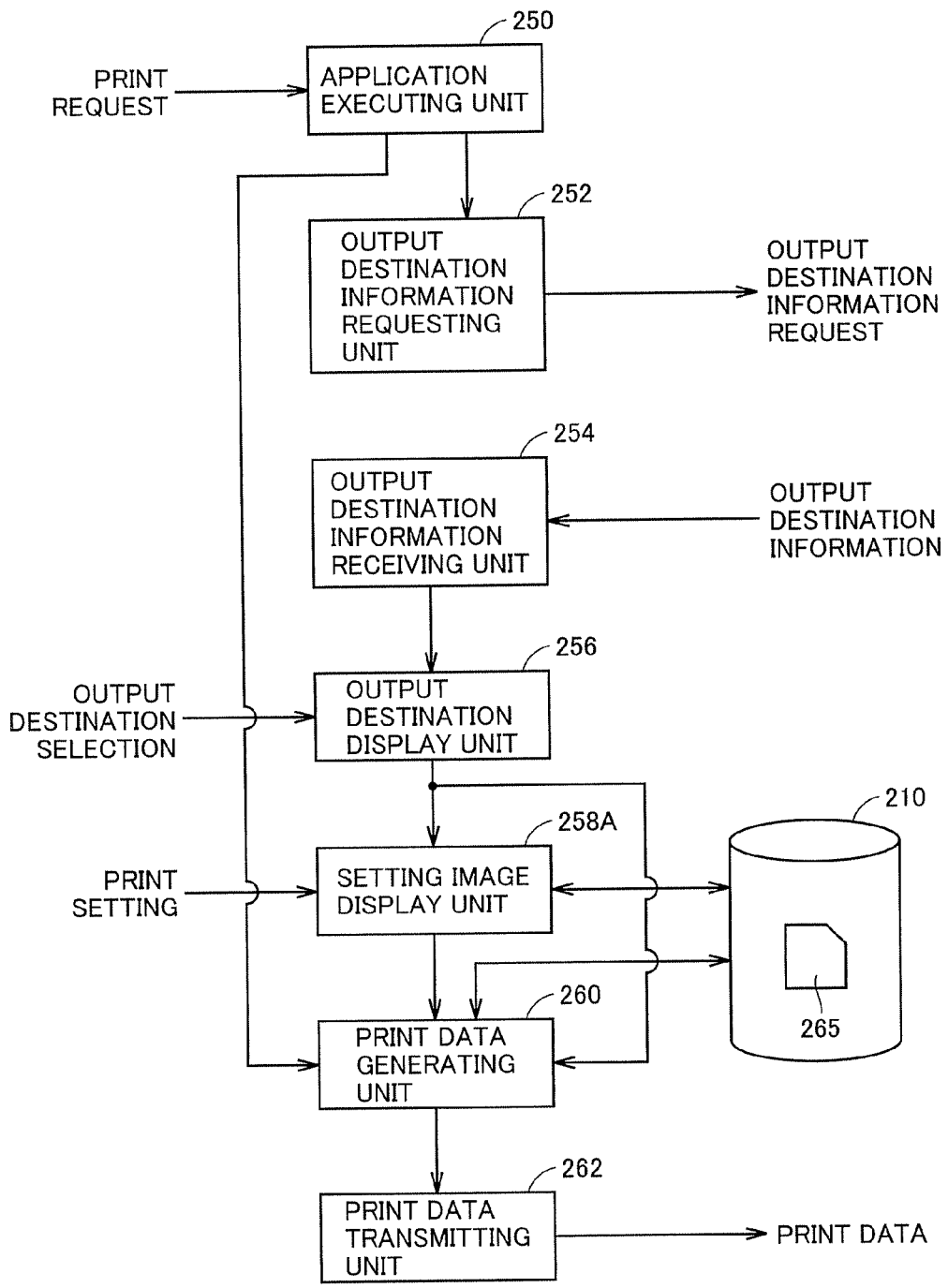
FIG. 20 is a block diagram representing functional configuration of a personal computer in accordance with Embodiment 2 of the present invention.

Referring to FIG. 20, the functional configuration of personal computer PC in accordance with Embodiment 2 of the present invention corresponds to the functional configuration of personal computer PC in accordance with Embodiment 1 shown in FIG. 5, with setting image display unit 258 replaced by setting image display unit 258A and printer driver group 264 replaced by an integrated printer driver 265, stored in hard disk unit 210. Except for these points, the functional configuration is the same as that shown in FIG. 5 and, therefore, detailed description will not be repeated.

Setting information display unit 258A loads integrated printer driver 265 to memory unit 212 or the like in advance, and in accordance with the information of output destination information from output destination display unit 256, the manner of display is changed. Specifically, integrated printer driver 256 allows display of a print setting image that contains all possible print setting items. When a specific image forming apparatus is selected, setting image display unit 258A changes the display such that only the executable print setting items are selectable, based on the device supporting state in the image forming apparatus. Further, if any specific image forming apparatus MFP is not selected, setting image display unit 258A changes the display such that only the print setting items that can be commonly executed by any image forming apparatus MFP are selectable.

Figure 21:
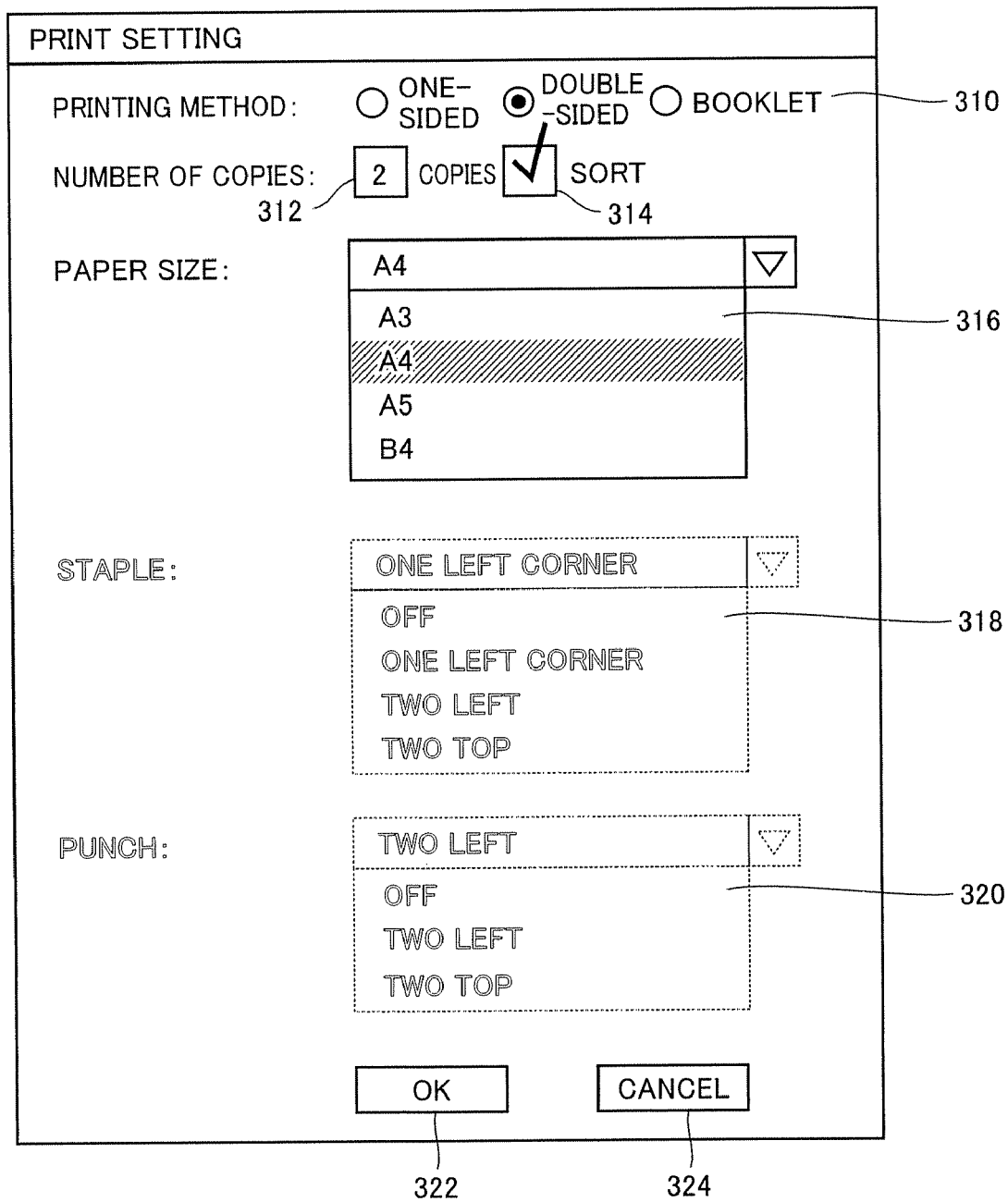
FIG. 21 shows an exemplary display of a print setting image in a personal computer in accordance with Embodiment 2 of the present invention.

FIG. 21 shows an exemplary display of the print setting image on the personal computer PC in accordance with Embodiment 2 of the present invention.

Referring to FIG. 21, setting image display unit 258A displays the print setting image containing all print setting items that can be set, and in accordance with the functions supported by the image forming apparatus MFP as the selected output destination, displays executable print setting items as valid and unexecutable print setting items as invalid. The items displayed as valid allow setting by the user, while the items displayed as invalid do not allow setting by the user, with the display being relatively dim (so-called grayout). In the example shown in FIG. 21, setting items 318 and 320 are in grayout display. The technique for setting part of the display in grayout manner has been well known and, therefore, detailed description will not be given here.

If any specific image forming apparatus is not selected, only the setting items 312 and 318 are displayed as valid, similar to the print setting image shown in FIG. 8 above.

According to Embodiment 2 of the present invention, in addition to the effects attained by Embodiment 1 described above, the effect of simplifying the types of printer drivers to be stored in the personal computer PC in advance can be attained. Specifically, what is necessary is to store only the integrated printer driver in advance. Therefore, in a pull print supporting image forming system including a large number of personal computers, management of each personal computer PC becomes easier.

Embodiment 3

In Embodiment 2 described above, a configuration has been described in which the setting item of the print setting image is given in grayout manner dependent on selection/non-selection of an image forming apparatus as the output destination. In the present embodiment, a configuration will be described in which the user is notified of possibility of unsatisfactory execution of the setting item.

The overall configuration of the image forming system in accordance with the present embodiment is similar to that of FIG. 1 described above and, therefore, detailed description will not be repeated. Further, hardware configurations of the personal computers, server and image forming apparatuses forming the image forming system are also the same as those of FIGS. 2 and 3 above and, therefore, detailed description will not be repeated. Further, overall process procedure in the image forming system in accordance with the present embodiment is similar to the overall process procedure in the image forming system in accordance with Embodiment 2 shown in FIG. 19 and, therefore, detailed description will not be repeated.

The functional configurations of respective apparatuses to realize the overall process sequence as such are the same as those of Embodiment 1 described above, except for the functional configuration of personal computer PC. Therefore, in the following, the functional configuration of personal computer PC in accordance with the present embodiment will be described.

(Functional Configuration of Personal Computer)

Figure 22:
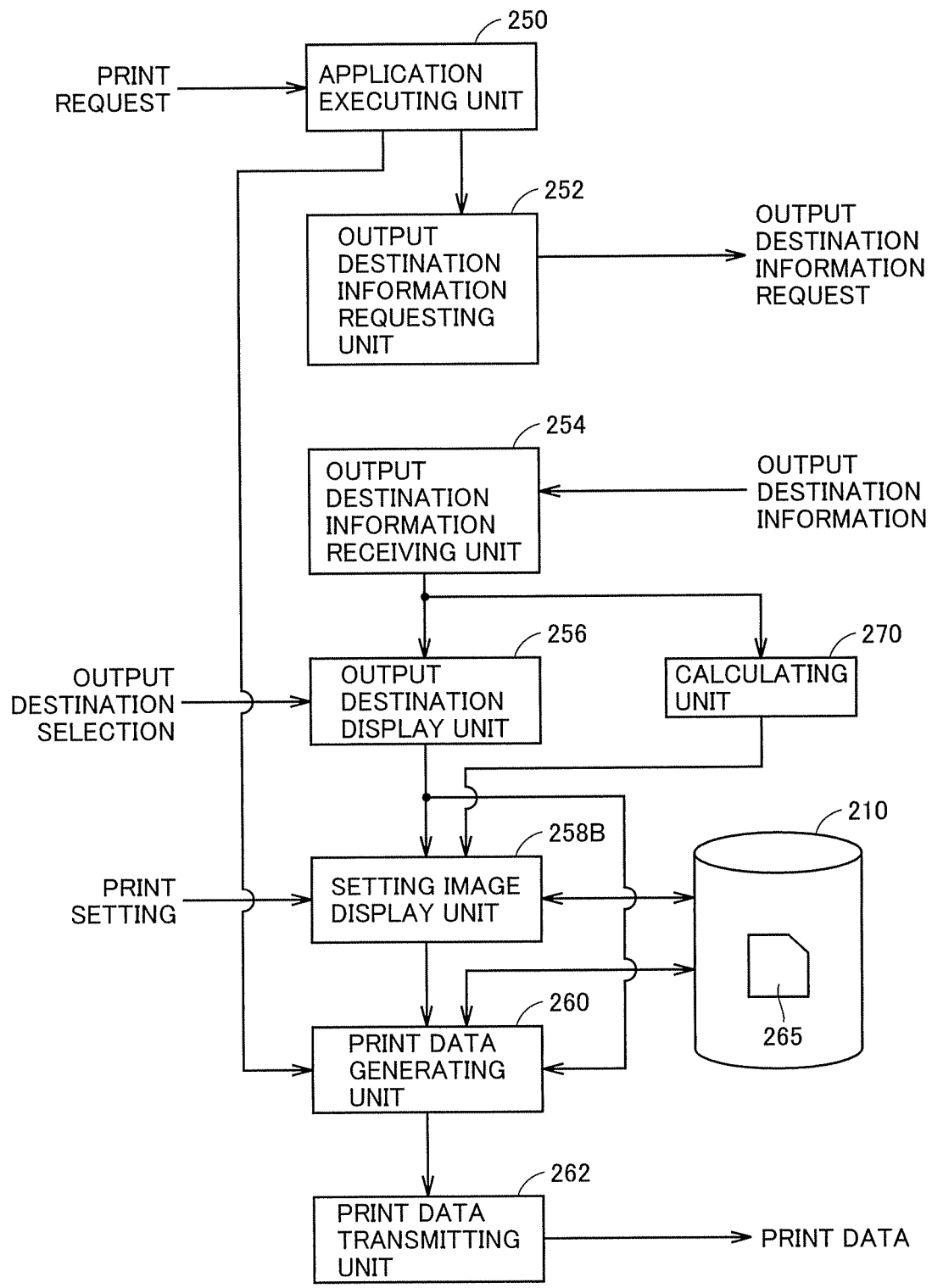
FIG. 22 is a block diagram representing functional configuration of a personal computer in accordance with Embodiment 3 of the present invention.

Referring to FIG. 22, the personal computer in accordance with Embodiment 3 of the present invention has the functional configuration of personal computer PC in accordance with Embodiment 2 shown in FIG. 20 with setting image display unit 258A replaced by setting image display unit 25B and additionally including a calculating unit 270.

Based on the output destination information from output destination display unit 256, calculating unit 270 calculates supporting ratio of each function installed in the image forming apparatuses MFP. Specifically, calculating unit 270 calculates, for each function, the ratio of image forming apparatuses supporting the function with respect to all image forming apparatuses capable of data communication with the server SRV. In other words, calculating unit 270 calculates the supporting ratio of each function shown in FIG. 14 (in the example shown in FIG. 14, the ratio of the number of "Ys" with respect to the total number of image forming apparatuses MFP for each function). Then, calculating unit 270 outputs the calculation information to setting image display unit 258B. The supporting ratio corresponds to the compatibility of the image forming system as a whole for each print setting item.

Setting image display unit 258B loads integrated printer driver 265 to memory unit 212 or the like in advance, and in accordance with the information of output destination selection from output destination display unit 256 and the calculation information from calculating unit 270, it changes the manner of display. Specifically, integrated printer driver 265 is capable of displaying the print setting image containing all settable print setting items. When a specific image forming apparatus MFP is selected, setting image display unit 258B adds, based on the state of supporting functions of the image forming apparatus MFP, a characteristic display to the print setting item or items that cannot be executed. Further, when any specific image forming apparatus is not selected, setting image display unit 258B adds a characteristic display to the print setting item or items other than the print setting item or items that can be commonly executed by any of the image forming apparatuses MFP. Thus, it is possible for the user to know in advance that some of the setting items are limited dependent on the image forming apparatus as the output destination.

Figure 23:
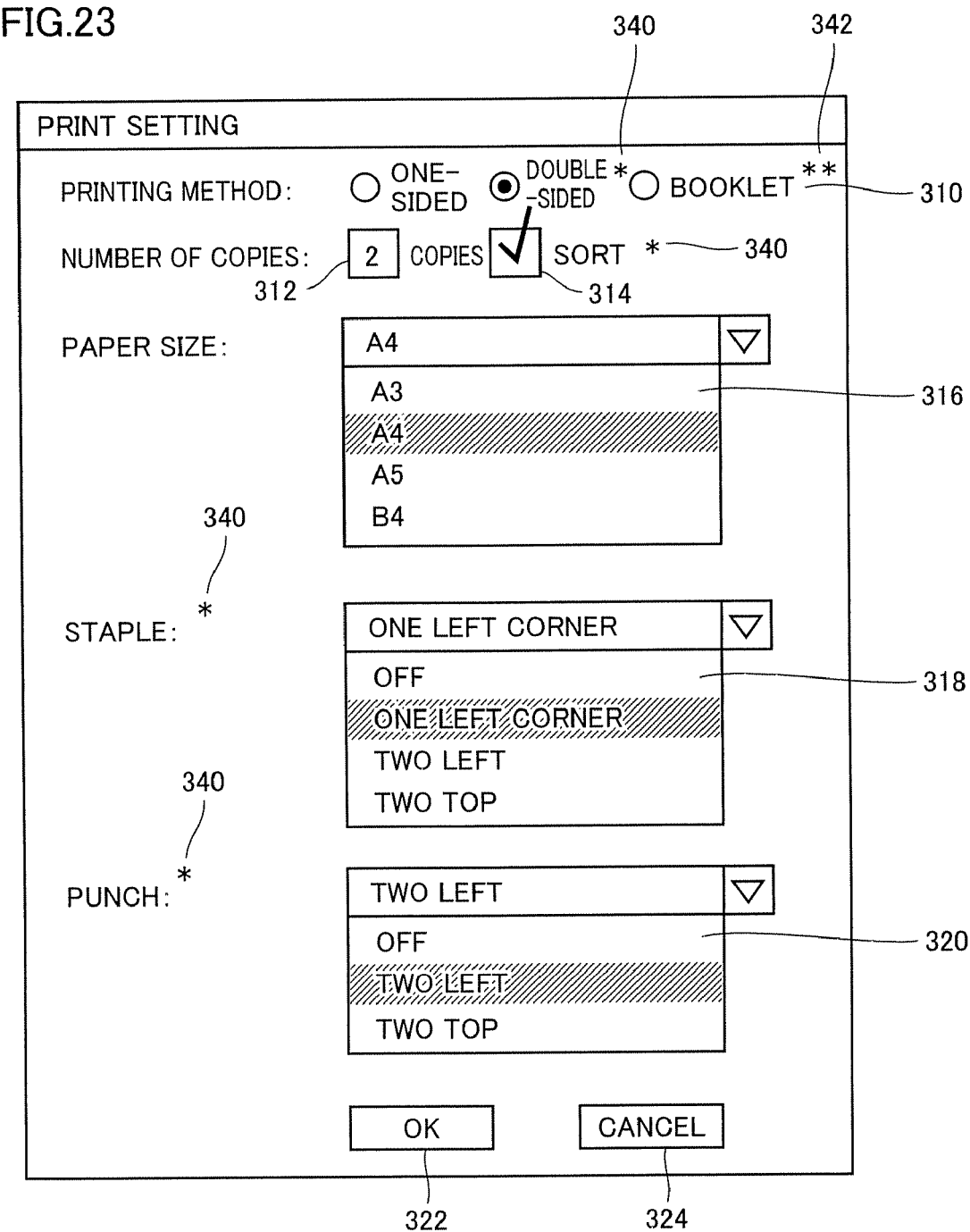
FIG. 23 shows an exemplary display of a print setting image in a personal computer in accordance with Embodiment 3 of the present invention.

FIG. 23 is an exemplary display of the print setting image of a personal computer PC in accordance with Embodiment 3 of the present invention.

Referring to FIG. 23, setting image display unit 258B displays the print setting image containing all settable print setting items and, in accordance with the functions supported by the image forming apparatus MFP as the selected output destination or non-selection of any image forming apparatus, setting image display unit 258B adds a characteristic display to unexecutable print setting item or items. In the example shown in FIG. 23, a mark 340 of "*" or a mark 342 of "" is added to each print setting item as the object. By way of example, the marks 340 and 342**, that is, "*" and "", represent ratio of supporting functions necessary to execute the print setting item having these marks added. For instance, the mark 340** of "*" represents a print setting item of which ratio of supporting corresponding function is 50% or more, while the mark 342 of "" represents the print setting item of which ratio of supporting corresponding function is lower than 50%. By adding such marks 340 and 342** as needed to the print setting items, it becomes possible for the user to know that the corresponding print setting item may possibly be unexecutable, as the image forming apparatus MFP does not support the necessary function, and to know the executability (adaptability) before generating the print data.

In the example shown in FIG. 23, executability of the print setting item is represented by using the mark "*". In place of, or in addition to the mark "*", the font type or font color displaying the name of the print setting item may be made different.

According to Embodiment 3 of the present invention, in addition to the effects attained by Embodiment 1 described above, the effect of simplifying the types of printer drivers to be stored in the personal computer PC in advance can be attained. Specifically, what is necessary is to store only the integrated printer driver in advance Therefore, in a pull print supporting image forming system including a large number of personal computers, management of each personal computer PC becomes easier.

Further, according to Embodiment 3 of the present invention, if a specific item can be executed by more than half the image forming apparatuses MFP in the entire image forming system, a user may desire to set the specific item even if it cannot be executed by some of the image forming apparatuses. On the print setting image in accordance with the present embodiment, a mark corresponding to the ratio of supporting the function necessary for the item is displayed, in correspondence with respective items. Therefore, the above-described manner of use can readily be adopted by the user.

Embodiment 4

In Embodiments 1 to 3 above, configurations have been described as examples in which the print setting image is displayed by loading a printer driver stored beforehand in the personal computer. In the present embodiment, a configuration will be described in which the printer driver necessary for the personal computer PC is supplied from the server SRV.

The overall configuration of the image forming system in accordance with the present embodiment is similar to that of FIG. 1 described above and, therefore, detailed description will not be repeated. Further, hardware configurations of the personal computers, server and image forming apparatuses forming the image forming system are also the same as those of FIGS. 2 and 3 above and, therefore, detailed description will not be repeated.

(Overall Process Sequence of Image Forming System)

First, referring to FIG. 24, the overall process in the image forming system in accordance with the present embodiment will be described.

Figure 24:
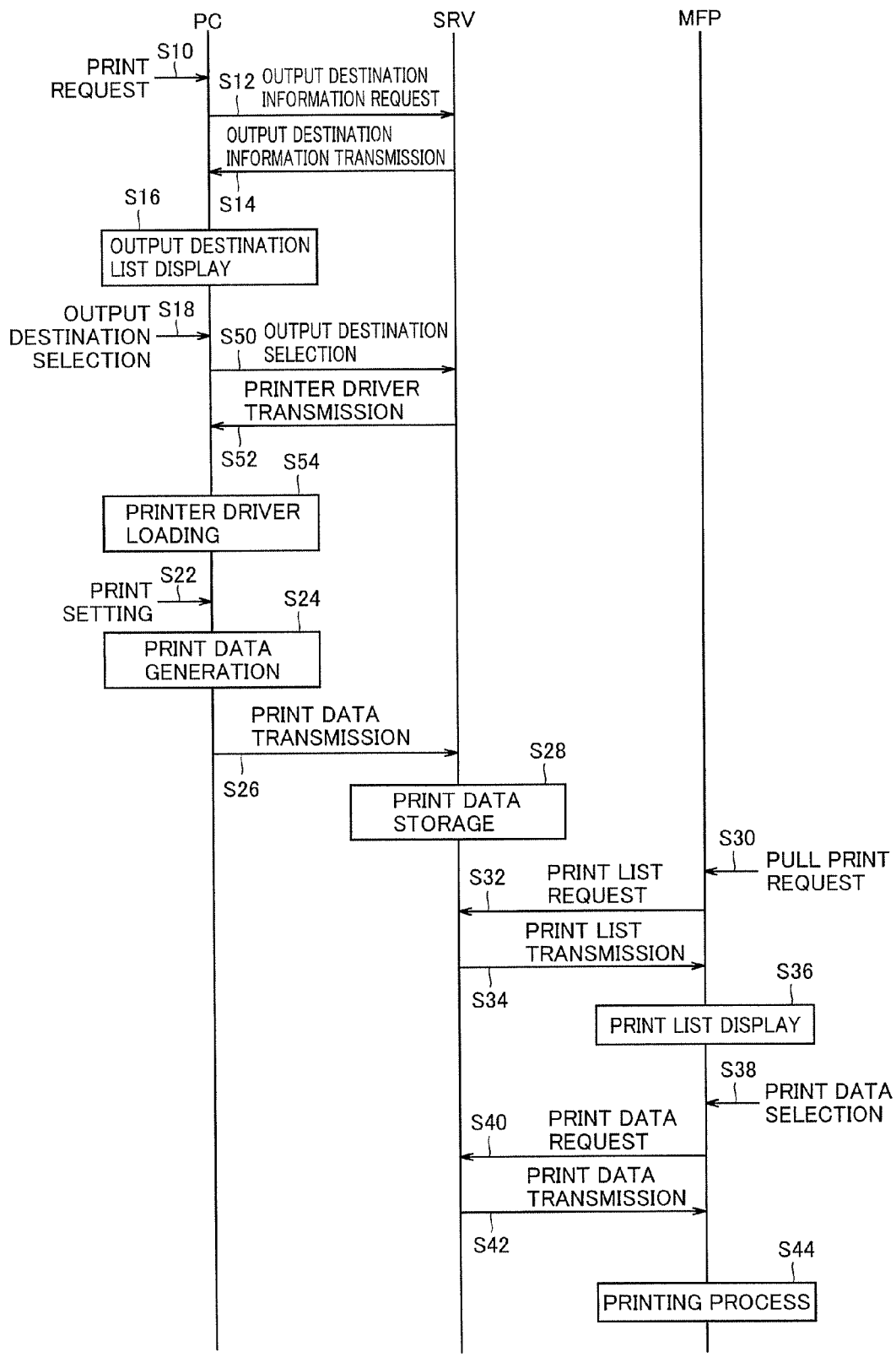
FIG. 24 is a sequence diagram representing an overall process procedure in the image forming system in accordance with Embodiment 4 of the present invention.

Referring to FIG. 24, the overall process sequence in the image forming system in accordance with the present embodiment corresponds to the overall process sequence in the image forming system in accordance with Embodiment 1 shown in FIG. 4 with step S20 changed to steps S50, S52 and S54. At step S50, receiving selection of an output destination by the user, personal computer PC transmits the output destination selection to server SRV. In response to the output destination selection, server SRV transmits a corresponding printer driver among at least one printer driver (instruction code) stored in advance, to personal computer PC (step S52). Personal computer PC loads the printer driver from the server SRV to memory unit 212 or the like (step S54), and displays a print setting image allowing print setting on display unit 204. Other processes are similar to those of the overall process sequence shown in FIG. 4 and, therefore, detailed description will not be repeated.

The functional configurations of respective apparatuses to realize the overall process sequence as such are the same as those of Embodiment 1 described above, except for the functional configurations of personal computer PC and server SRV. Therefore, in the following, the functional configurations of personal computer PC and server SRV will be described.

(Functional Configuration of Personal Computer)

Figure 25:
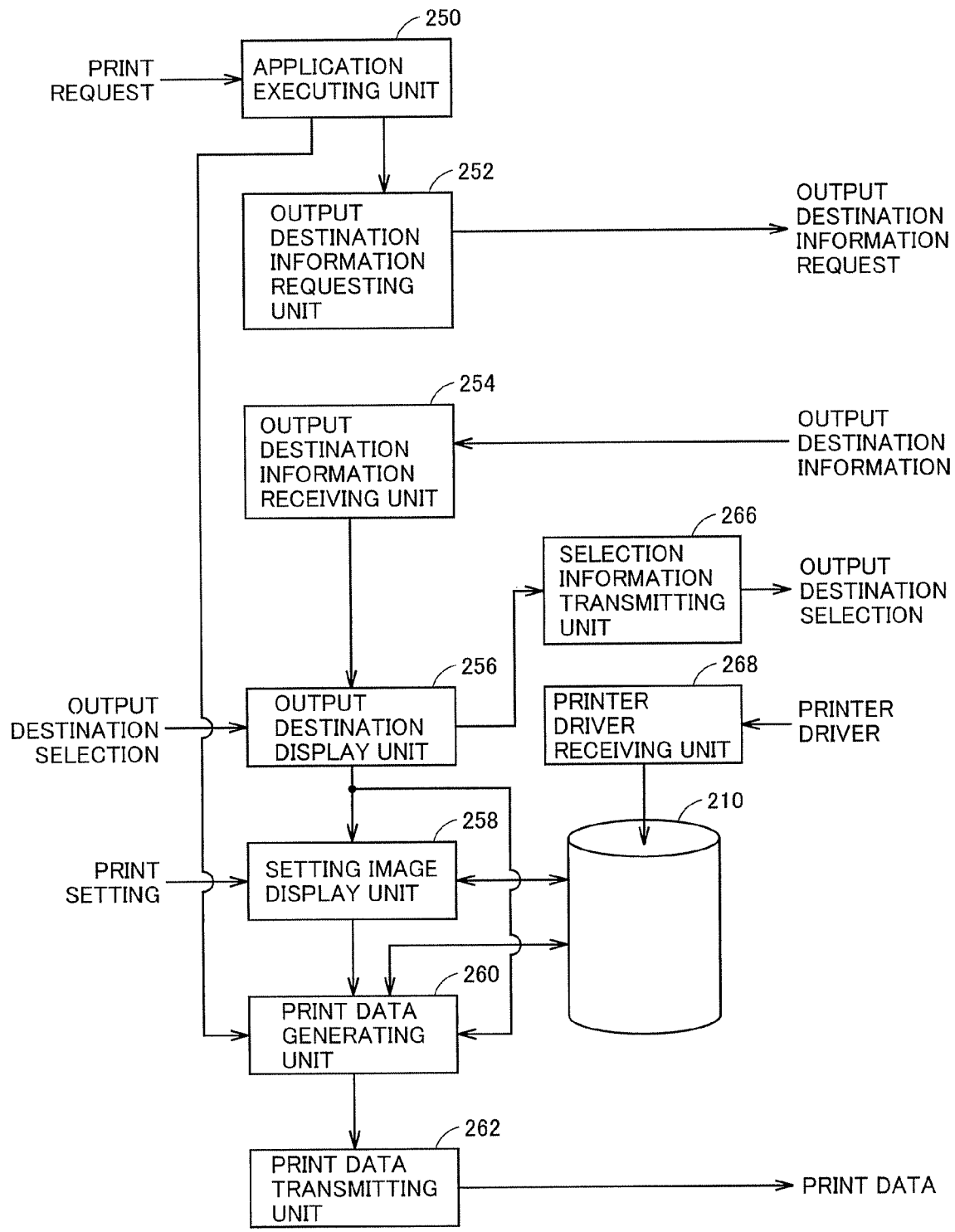
FIG. 25 is a block diagram representing functional configuration of a personal computer in accordance with Embodiment 4 of the present invention.

Referring to FIG. 25, the functional configuration of personal computer PC in accordance with Embodiment 4 of the present invention corresponds to the functional configuration of personal computer PC in accordance with Embodiment 1 shown in FIG. 5, additionally including a selection information transmitting unit 266 and printer driver receiving unit 268 and omitting storage of printer driver group 264.

Receiving the information of output destination selection from output destination display unit 256, selection information transmitting unit 266 transmits the information of output destination selection to server SRV. Further, printer driver receiving unit 268 receives the printer driver transmitted by server SRV in response to the transmission of information of output destination selection, and stores the received printer driver in hard disk unit 210. Setting image display unit 258 loads the printer driver stored in hard disk unit 210 to memory unit 212 or the like, whereby the print setting image is displayed on display unit 204.

Other functional blocks are the same as those of FIG. 5 and, therefore, detailed description thereof will not be repeated.

(Functional Configuration of Server SRV)

Figure 26:
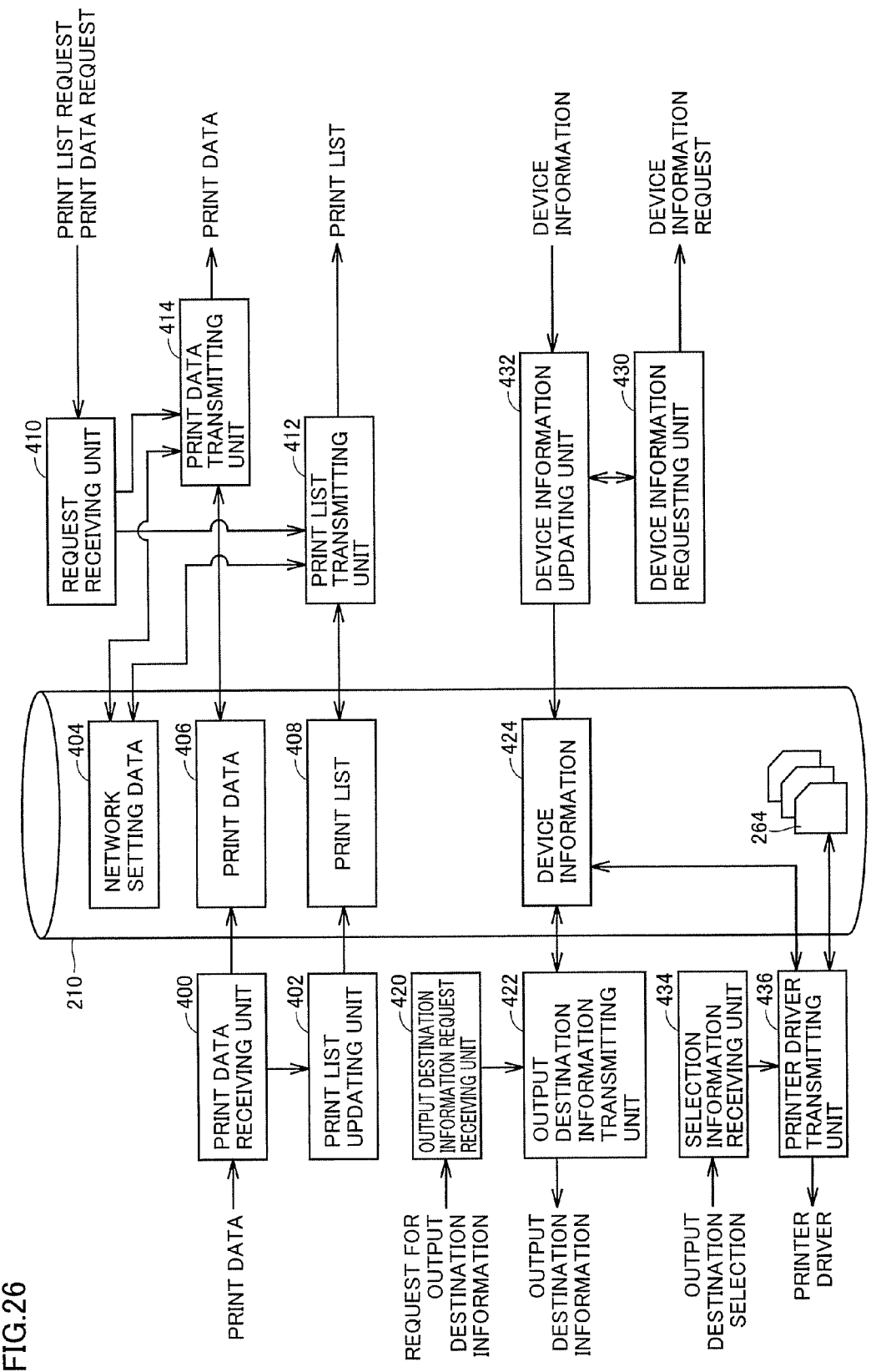
FIG. 26 is a block diagram representing a functional configuration of a server in accordance with Embodiment 4 of the present invention.

Referring to FIG. 26, the server SRV in accordance with Embodiment 4 of the present invention has the functional configuration corresponding to the server SRV in accordance with Embodiment 1 shown in FIG. 11, additionally including selection information receiving unit 434 and printer driver transmitting unit 436, with printer driver group 264 stored in hard disk unit 210.

Selection information receiving unit 434 receives the information of output destination selection from personal computer PC, and outputs the received information of output destination selection to printer driver transmitting unit 436. In accordance with the information of output destination selection from selection information receiving unit 434, printer driver transmitting unit 436 obtains the state of supporting functions in the selected image forming apparatus MFP, with reference to the device information storage unit 424. Then, based on the obtained state of supporting functions in the image forming apparatus MFP, printer driver transmitting unit 436 selects one corresponding printer driver. Further, printer driver transmitting unit 436 transmits the selected printer driver to personal computer PC.

Other functional blocks are similar to those of FIG. 11 and, therefore, detailed description will not be repeated.

According to Embodiment 4 of the present invention, in addition to the effects attained by Embodiment 1 described above, the effect of simplifying the types of printer drivers to be stored in the personal computer PC in advance can be attained. Specifically, the printer driver group is stored in advance in the server SRV, and in accordance with the output destination selection from respective personal computers, appropriate printer drivers can be supplied. Therefore, in a pull print supporting image forming system including a large number of personal computers, management of each personal computer PC becomes easier.

Other Embodiments

The program in accordance with the present invention may be realized by calling necessary modules in a prescribed sequence at prescribed timings to execute processes, from program modules provided as part of the operating system (OS) of a computer. In such a case, the program itself does not include the modules mentioned above, and the processes are executed in cooperation with the OS. Such program not including the modules is also encompassed by the present invention.

Further, the program in accordance with the present invention may be provided incorporated as a part of another program. In that case also, the program itself does not include the modules included in said another program, and the processes are executed in cooperation with said another program. Such a program incorporated in another program is also encompassed by the present invention.

The program product provided by the invention is executed installed in a program storage such as a hard disk. The program product includes the program itself and a storage medium storing the program.

Further, part of or all of the functions realized by the program in accordance with the present invention may be implemented by dedicated hardware.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image forming system, comprising:
   at least one information processing apparatus capable of transmitting print data;
   a server receiving said print data from said information processing apparatus; and
   at least one image forming apparatus capable of data communication with said server; wherein
   said information processing apparatus includes
   an output destination information requesting unit transmitting a request for output destination information of said print data to said server, in accordance with a user operation,
   an output destination display unit displaying a list of output destinations based on the output destination information from said server,
   a setting image display unit displaying a setting image for receiving setting related to image formation, in accordance with a user operation input to the list of said output destinations,
   a print data generating unit generating print data in accordance with a user operation input to said setting image, and
   a print data transmitting unit transmitting said generated print data to said server;
   said setting image display unit changes manner of display of said setting image dependent on selection/non-selection of a specific output destination;
   said server includes
   an output destination information transmitting unit responsive to said output destination information request from said information processing apparatus, for transmitting device information and printing function information obtained in advance for each said image forming apparatus as said output destination information, to said information processing apparatus,
   a print data storage unit storing said print data from said information processing device,
   a list transmitting unit responsive to a list request from said image forming apparatus, for transmitting, to the image forming apparatus as a transmission source of the list request, a list of said print data and, when a selection of output destination has been made at said information processing apparatus, a corresponding selected output destination for each of said print data in said list stored in said print data storage unit, and
   a print data transmitting unit responsive to the print data request from said image forming apparatus, for transmitting a specific print data stored in said print data storage unit to said image forming apparatus; and
   said image forming apparatus includes
   a list requesting unit transmitting said list request to said server, in accordance with a user operation,
   a list display unit displaying the list of said print data and the corresponding selected output destination for each of said print data in said list from said server,
   a print data requesting unit transmitting said data request for specifying the selected print data to said server in accordance with a user operation, and
   a processing unit for performing an image forming process based on said print data from said server.

2. The image forming system according to claim 1, wherein said print data generating unit adds information indicating selection and non-selection of said specific output destination to said print data;
   said list transmitting unit transmits said list including the information indicating selection and non-selection of said specific output destination added to said print data; and
   said list display unit displays said list of print data together with the information indicating selection and non-selection of said specific output destination.

3. The image forming system according to claim 1, wherein said image forming apparatus is capable of selectively supporting a plurality of functions;

said setting related to image formation includes an item that depends on any of said plurality of functions;
said output destination information includes a state of supporting said plurality of functions in said image forming apparatus; and
said setting image display unit displays, when a specific output destination is selected, a specific setting image based on said state of supporting in the image forming apparatus as the selected output destination.

4. The image forming system according to claim 3, wherein said setting image display unit displays said setting image, using an instruction code corresponding to said state of supporting in the image forming apparatus as said selected output destination, among a plurality of instruction codes stored in advance.

5. The image forming system according to claim 3, wherein said information processing apparatus further includes a selection information transmitting unit transmitting selection information specifying said selected output destination to said server;
said server further includes an instruction code transmitting unit responsive to said selection information from said information processing apparatus for transmitting, among a plurality of instruction codes stored in advance, an instruction code corresponding to said state of supporting in the image forming apparatus as said selected output destination, to said information processing apparatus; and
said setting image display unit displays said setting image, using the instruction code from said server.

6. The image forming system according to claim 3, wherein said setting image display unit displays a setting image consisting of items commonly executable by said image forming apparatuses, when a specific output destination is not selected.

7. The image forming system according to claim 3, wherein said information processing apparatus further includes a calculating unit calculating ratio of supporting each of said plurality of functions, based on the output destination information from said server; and
when a specific output destination is not selected, said setting image display unit changes, together with items included in said setting related to image formation, the manner of display of each item, in accordance with the ratio of supporting the function necessary to execute the corresponding item.

8. An image forming method using an image forming system, wherein
said image forming system includes
at least one information processing apparatus capable of transmitting print data;
a server receiving said print data from said information processing apparatus; and
at least one image forming apparatus capable of data communication with said server; said image forming method comprising the steps of:
receiving, in said server, a request from said information processing apparatus for output destination information of said print data, in accordance with a user operation;
transmitting, from said server, device information obtained in advance for each said image forming apparatus as said output destination information to said information processing apparatus for user display, in response to said request for output destination information from said information processing apparatus;
displaying, on said information processing apparatus, a list of output destinations based on the output destination information from said server and a setting image allowing setting related to image formation, in accordance with a user operation input to said list of output destinations;
generating, in said information processing apparatus, print data in accordance with a user operation input to said setting image and transmitting said generated print data to said server;
storing, in said server, a list of print data and, if a selection of output destination has been made at said information processing apparatus, a corresponding selected output destination for each of said print data in said list from said information processing apparatus;
transmitting, to said server from said image forming apparatus, a list request in accordance with a user operation;
transmitting, from said server, in response to said list request from said image forming apparatus, the list of stored said print data and selected output destinations for said print data to the image forming apparatus as a source of transmission of the list request for displaying said list of said print data and the corresponding selected output destination for each of said print data in said list;
displaying, at said image forming apparatus, the list of said print data received from said server;
transmitting, to said server from said image forming apparatus, a print data request for specifying selected print data in accordance with a user operation;
transmitting, from said server, in response to said print data request from said image forming apparatus, stored specific print data to the image forming apparatus; and
performing, by said image forming apparatus, an image forming process based on said print data received from said server.

9. The image forming method according to claim 8, wherein
said step of generating print data includes the step of adding information indicating selection and non-selection of said specific output destination to said print data;
said step of transmitting the list of said print data includes the step of transmitting said list including the information indicating selection and non-selection of said specific output destination added to said print data; and
said step of displaying the list includes the step of displaying the list of said print data together with the information indicating selection and non-selection of said specific output destination.

10. The image forming method according to claim 8, wherein
said image forming apparatus is capable of selectively supporting a plurality of functions;
said setting related to image formation includes an item that depends on any of said plurality of functions;
said output destination information includes a state of supporting said plurality of functions in said image forming apparatus; and
said step of displaying said setting image further includes the step of displaying, when a specific output destination is selected, a specific setting image, based on said state of supporting in the image forming apparatus as said selected output destination.

11. The image forming method according to claim 10, wherein said step of displaying said setting image further includes the step of displaying said setting image, using an instruction code corresponding to said state of supporting in the image forming apparatus as said selected output destination, among a plurality of instruction codes stored in advance.

12. The image forming method according to claim 10, further comprising the steps of:
said information processing apparatus transmitting selection information specifying said selected output destination to said server; and
said server transmitting, to said information processing apparatus, an instruction code corresponding to said state of supporting in the image forming apparatus as said selected output destination, among a plurality of instruction codes stored in advance, in response to said selection information from said information processing apparatus; wherein
said step of displaying said setting image further includes the step of displaying said setting image using the instruction code from said server.

13. The image forming method according to claim 10, wherein
said step of displaying said setting image further includes the step of displaying a setting image consisting of items commonly executable by said image forming apparatuses, when a specific output destination is not selected.

14. The image forming method according to claim 10, further comprising the step of:
said information processing apparatus calculating ratio of supporting each of said plurality of functions, based on the output destination information from said server; wherein
said step of displaying the setting image further includes the step of changing, when a specific output destination is not selected, together with the items included in said setting related to image formation, the manner of display of each item, in accordance with the ratio of supporting the function necessary to execute the corresponding item.

15. An information processing apparatus capable of transmitting print data to a server, wherein
said server is configured for data communication with at least one information processing apparatus and at least one image forming apparatus, wherein said server receives print data and, if a selection of output destination has been made at said information processing apparatus, corresponding selected output destinations from said information and transmits a list of said print data and indication of said corresponding selected output destination for each of said print data to said image forming apparatus in response to a request from said image forming apparatus;
said information processing apparatus comprising
an output destination information requesting unit for transmitting a request for output destination information of said print data to said server, in accordance with a user operation; wherein
said server transmits, in response to said request for output destination information, device information obtained in advance for each said image forming apparatus as said output destination information to said information processing apparatus;
said information processing apparatus further comprising:
an output destination display unit displaying a list of output destinations based on the output destination information from said server;
a setting image display unit displaying a setting image for receiving setting related to image formation, in accordance with a user operation input to the list of said output destinations;
a print data generating unit generating print data in accordance with a user operation input to said setting image; and
a print data transmitting unit transmitting generated said print data to said server; wherein
said setting image display unit changes the manner of displaying said setting image, dependent on selection of a specific output destination or non-selection of an output destination.

16. The image forming method according to claim 8 wherein
said step of displaying the setting image includes the step of changing the manner of display of said setting image dependent on selection of a specific output destination or non-selection of an output destination.

* * * * *